United States Patent
Molenje et al.

(10) Patent No.: US 11,862,036 B2
(45) Date of Patent: Jan. 2, 2024

(54) METHOD AND SYSTEM FOR GENERATING AND MANAGING PLAYS IN AN ELECTRONIC FORUM

(71) Applicants: Luvisia Molenje, North Bethesda, MD (US); Patrick Murphy, Shirley, MA (US)

(72) Inventors: Luvisia Molenje, North Bethesda, MD (US); Patrick Murphy, Shirley, MA (US)

(73) Assignee: CLIPBOARD NATION, INC., Washington, DC (US)

( * ) Notice: Subject to any disclaimer, the term of this patent is extended or adjusted under 35 U.S.C. 154(b) by 46 days.

(21) Appl. No.: 15/636,654

(22) Filed: Jun. 29, 2017

(65) Prior Publication Data

US 2018/0005544 A1 Jan. 4, 2018

Related U.S. Application Data

(60) Provisional application No. 62/356,463, filed on Jun. 29, 2016.

(51) Int. Cl.
| | |
|---|---|
| *G09B 19/00* | (2006.01) |
| *G06Q 50/00* | (2012.01) |
| *G06F 3/04883* | (2022.01) |
| *A63B 71/06* | (2006.01) |
| *A63B 69/00* | (2006.01) |
| *G06Q 10/101* | (2023.01) |

(52) U.S. Cl.
CPC ........ *G09B 19/0038* (2013.01); *A63B 69/002* (2013.01); *A63B 71/0622* (2013.01); *G06F 3/04883* (2013.01); *G06Q 10/101* (2013.01); *G06Q 50/01* (2013.01)

(58) Field of Classification Search
CPC ............ G06T 2219/024; G06Q 10/101; G06Q 10/103; G06Q 50/01; G09B 19/0038; H04M 7/0027; H04L 29/06401; H04L 65/00; H04L 65/4015; G06F 3/04883; A63B 71/0622; A63B 69/002
USPC .......................................................... 463/7
See application file for complete search history.

(56) References Cited

U.S. PATENT DOCUMENTS

| | | | |
|---|---|---|---|
| 7,024,456 B1 * | 4/2006 | Simonoff | G06Q 10/10 709/205 |
| 7,310,657 B2 * | 12/2007 | Nakamura | G06F 9/54 709/204 |
| 8,510,172 B2 | 8/2013 | O'Hara et al. | |
| 9,266,017 B1 * | 2/2016 | Parker | A63F 13/355 |
| 9,628,518 B1 * | 4/2017 | Sandvik | H04M 7/0027 |
| 9,953,365 B2 | 4/2018 | Friedman | |

(Continued)

*Primary Examiner* — Chase E Leichliter
(74) *Attorney, Agent, or Firm* — Kiklis and Clark, PLLC

(57) ABSTRACT

A method and system for generating and managing a play are provided. The method includes drawing the play via an electronic forum. The play includes a plurality of players. The electronic forum includes a plurality of buttons or drawing markers for defining moves of the plurality of players. The method also includes posting the play to the electronic forum. Further, the method includes providing access to the play to a user via the electronic forum. In addition, the method includes receiving an edit to the play from the user. The method also includes editing the play. Further, the method includes providing the edited play.

19 Claims, 41 Drawing Sheets

(56) References Cited

U.S. PATENT DOCUMENTS

| | | | |
|---|---|---|---|
| 2002/0052918 A1* | 5/2002 | Rekimoto | G06Q 10/10 709/204 |
| 2003/0103089 A1* | 6/2003 | Ramani | G06F 30/00 715/848 |
| 2005/0021352 A1* | 1/2005 | Maierhofer | G06Q 50/205 705/7.24 |
| 2005/0084087 A1* | 4/2005 | Rajagopalan | H04M 7/0027 379/205.01 |
| 2008/0146302 A1* | 6/2008 | Olsen | A63F 13/211 463/7 |
| 2008/0288590 A1* | 11/2008 | Lynch | G09B 19/0038 709/204 |
| 2008/0301290 A1* | 12/2008 | Ahmed | H04L 67/1095 709/224 |
| 2009/0063991 A1 | 3/2009 | Baron et al. | |
| 2009/0076843 A1* | 3/2009 | Graff | G16H 80/00 705/2 |
| 2009/0137298 A1* | 5/2009 | Bedingfield, Sr. | G06Q 10/10 463/9 |
| 2009/0193345 A1* | 7/2009 | Wensley | H04L 65/1059 715/756 |
| 2011/0126127 A1* | 5/2011 | Mariotti | H04M 7/0027 715/753 |
| 2012/0244942 A1* | 9/2012 | Meyer | A63F 13/537 463/32 |
| 2012/0283007 A1 | 11/2012 | Sanders | |
| 2013/0028400 A1* | 1/2013 | Fix | G09B 5/12 379/88.13 |
| 2013/0036021 A1 | 2/2013 | Wright | |
| 2013/0065655 A1* | 3/2013 | King | G06T 13/00 463/2 |
| 2013/0139068 A1* | 5/2013 | Bowring | G06F 3/048 715/747 |
| 2013/0144566 A1* | 6/2013 | De Biswas | G06T 17/005 703/1 |
| 2013/0203494 A1* | 8/2013 | Coiner, Jr. | G06F 16/26 463/37 |
| 2013/0215116 A1* | 8/2013 | Siddique | G06Q 20/204 345/420 |
| 2013/0316837 A1* | 11/2013 | Coiner, Jr. | G06F 16/73 463/43 |
| 2014/0274303 A1 | 9/2014 | Funches et al. | |
| 2014/0364974 A1* | 12/2014 | Wohl | G05B 15/02 700/91 |
| 2014/0370486 A1* | 12/2014 | Friehauf | G09B 7/00 434/362 |
| 2015/0149929 A1* | 5/2015 | Shepherd | H04L 65/403 715/753 |
| 2016/0008693 A1* | 1/2016 | Cronin | A63B 71/06 700/91 |
| 2016/0049082 A1* | 2/2016 | Leatherman, III | H04L 65/4015 434/408 |
| 2016/0148280 A1* | 5/2016 | Marth | G06Q 30/0276 705/14.42 |
| 2016/0210602 A1* | 7/2016 | Siddique | G06Q 10/0637 |
| 2016/0321950 A1* | 11/2016 | McQuistan | G06N 5/02 |
| 2016/0357720 A1* | 12/2016 | Thimbleby | G06F 3/0484 |
| 2017/0046967 A1* | 2/2017 | Sundquist | G09B 9/00 |
| 2017/0063957 A1* | 3/2017 | Rolih | H04B 1/385 |
| 2017/0065872 A1* | 3/2017 | Kelley | A63B 71/0622 |
| 2017/0128840 A1* | 5/2017 | Croci | A63F 13/65 |
| 2017/0169857 A1 | 6/2017 | Zhao | |
| 2017/0291068 A1* | 10/2017 | Curley | G09B 5/02 |

\* cited by examiner

CONNECTIONS

ALL MEMBERS [46]  SORT BY: LAST ACTIVE ▼  402

ABC - "OLA OLA" VIEW
ACTIVE 1 MINUTE AGO

LUCKY - "ANOTHER TEST @KYANGAS" VIEW
ACTIVE 15 HOURS, 8 MINUTES AGO

HANGMAN - "GO SKINS" VIEW
ACTIVE 18 HOURS, 6 MINUTES AGO

WAQAR HUSSAIN
ACTIVE 2 DAYS, 22 HOURS AGO
  404

NAME: SARA
CLEAR

ALL MEMBERS [46]  SORT BY

SARA - "OLA" VIEW
ACTIVE 2 MONTHS, 2 W

EVA SARAGOSA
ACTIVE 8 MONTHS, 4 W

VIEWING 1-2 OF 2 ACTIVE MEMB

504

NAME
SARA

STATE
HEAD COACH
OC
DC
ASSISTANT

LEVEL
YOUTH
HS
PREP/JC
COLLEGE-DIV II/III

REGION
USA
CANADA
EUROPE
OTHER

STATE
NON-US
AL
AK
AZ

OFFENSE
AIR RAID
DOUBLE WING
I FORMATION
MULTIPLE

DEFENSE
3-3 STACK
3-4
3-5-3
4-3

SEARCH  502

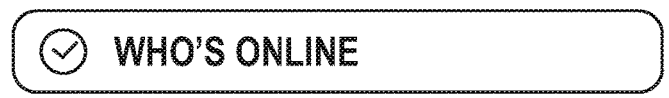

| HOMEPAGE > FORUMS | | | |
|---|---|---|---|
| FORUM | TOPICS | POSTS | FRESHNESS |
| OFFENSE<br>— GENERAL OFFENSE (17 TOPICS, 14 REPLIES)<br>— PASSING GAME (6 TOPICS, 1 REPLIES)<br>— PASS PROTECTION (1 TOPICS, 0 REPLIES)<br>— RUNNING GAME (4 TOPICS, 1 REPLIES) | 31 | 47 | 1 MONTH AGO<br>WAQAR HUSSAIN |
| DEFENSE<br>— FRONTS & STUNTS (3 TOPICS, 3 REPLIES)<br>— SECONDARY (3 TOPICS, 4 REPLIES)<br>— DEFENSIVE DRILLS (2 TOPICS, 2 REPLIES) | 11 | 24 | 2 MONTHS, 1 WEEK AGO<br>DANIEL |
| STRENGTH & CONDITIONING<br>— GENERAL STRENGTH & CONDITIONING (0 TOPICS, 0 REPLIES)<br>— WEIGHT TRAINING (0 TOPICS, 0 REPLIES)<br>— SPEED & AGILITY (0 TOPICS, 0 REPLIES) | 1 | 1 | 4 MONTHS AGO<br>HANGMAN |

HOMEPAGE > FORUMS > OFFENSE

THIS CATEGORY CONTAINS 31 TOPICS AND 16 REPLIES, AND WAS LAST UPDATED BY WAQAR HUSSAIN 1 MONTH AGO.

| FORUM | TOPICS | POSTS | FRESHNESS |
|---|---|---|---|
| – GENERAL OFFENSE | 17 | 31 | 1 MONTH AGO<br>WAQAR HUSSAIN |
| – PASSING GAME | 6 | 7 | 10 MONTHS, 1 WEEK AGO<br>MINI MANSTER |
| – PASS PROTECTION | 1 | 1 | 1 YEAR, 2 MONTHS AGO<br>AVACADO TWENTYTHREE |
| – RUNNING GAME | 4 | 5 | 9 MONTHS, 2 WEEKS AGO<br>LUCKY |

HOMEPAGE > FORUMS > OFFENSE > - GENERAL OFFENSE     SUBSCRIBE

THIS CATEGORY CONTAINS 17 TOPICS AND 14 REPLIES, AND WAS LAST UPDATED BY WAQAR HUSSAIN 1 MONTH AGO.

VIEWING 15 TOPICS - 1 THROUGH 15 (OF 17 TOTAL)     [1] [2] →

| TOPICS | VOICES | POSTS | FRESHNESS |
|---|---|---|---|
| ANOTHER TEST<br>STARTED BY: LUCKY | 2 | 5 | 1 MONTH AGO<br>WAQAR HUSSAIN |
| BEST PLAY EVER<br>STARTED BY: LUCKY | 2 | 2 | 1 MONTH, 2 WEEKS AGO<br>WAQAR HUSSAIN |
| S3 TEST<br>STARTED BY: LUCKY | 1 | 1 | 3 MONTHS, 1 WEEK AGO<br>LUCKY |
| TEST POST<br>STARTED BY: HANGMAN | 1 | 1 | 3 MONTHS, 1 WEEK AGO<br>HANGMAN |
| WAQAR<br>STARTED BY: HANGMAN | 2 | 2 | 3 MONTHS, 1 WEEK AGO<br>WAQAR HUSSAIN |

NEWS / ARCHIVES

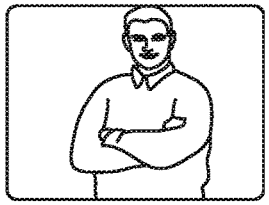

TOM BEGINS CAMP DOING THINGS HIS WAY, WITH PLAYER INPUT
AUGUST 3, 2015    SOURCE: NEW COLLEGE TIMES

TOM WALKED THROUGH THE CAFETERIA ON DAY 1 AND FIST-BUMPED A CHEF FROM ACROSS THE HIGH COUNTER, THEN ASKED ANOTHER MEMBER OF THE KITCHEN STAFF ABOUT HER FAMILY. HE WAS MORE RED-FACED...>>

LOVE HIM OR HATE HIM, NICK REMAINS AT TOP
AUGUST 2, 2015    SOURCE: NORTHWEST NEWS

NICK DRONED ON AND ON DURING HIS OPENING STATEMENT A FEW WEEKS AGO FOR SEC FOOTBALL MEDIA DAYS. BY THE TIME HE OPENED THE NEWS CONFERENCE TO QUESTIONS, APPARENTLY NOT ONE OF HIS FAVOR...>>

TOM BEGINS CAMP DOING THINGS HIS WAY, WITH PLAYER INPUT

SAN FRANCISCO HEAD COACH TOM WATCHES PLAYERS DURING THE TEAM'S NFL FOOTBALL TRAINING CAMP IN SANTA CLARA, CALIF, SATURDAY, AUG. 1, 2015. (AP PHOTO/JEFF CHIU) MORE>

BY JANIE - ASSOCIATED PRESS - SUNDAY, AUGUST 2, 2015

SANTA CLARA, CALIF. (AP) - TOM WALKED THROUGH THE CAFETERIA ON DAY 1 AND FIST-BUMPED A CHEF FROM ACROSS THE HIGH COUNTER, THEN ASKED ANOTHER MEMBER OF THE KITCHEN STAFF ABOUT HER FAMILY.

SIGN UP FOR BREAKING NEWS ALERTS
ENTER ADDRESS...   SUBMIT

NC TEAM CLAIM COASTAL AND BOWL PREDICTIONS | JEFF ACC POWER POLL

NC TEAM CLAIM COASTAL AND BOWL PREDICTIONS JEFF ACC POWER POLL

POPULAR VIDEOS
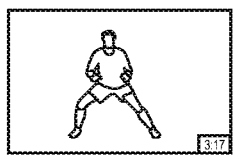   
S STOP DROP MECHANICS ★★★★★    HOW TO JAM THE RECEIVER (MARCU.. ★★★★★    FOOTBALL DRILL FOR STAYING LOW ★★★★★    LINEBACKER DRILL ★★★★★
1402
RECENT VIDEOS
  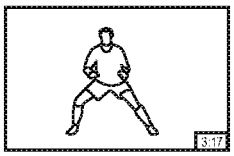 
LINEBACKER DRILL ★★★★★    FOOTBALL DRILL FOR STAYING LOW ★★★★★    S STOP DROP MECHANICS ★★★★★    HOW TO JAM THE RECEIVER (MARCU.. ★★★★★
1400
FIG. 14

BLOGS
COACH JEFF
THU, OCT 01, 2015
SOURCE: YOUTH FOOTBALL ONLINE
CROSS BLITZ- 62 DEFENSE
COACH JEFF
THU, OCT 01, 2015
SOURCE: YOUTH FOOTBALL ONLINE
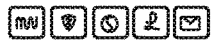
OVERCOMING THE ADVANTAGE OF RUN-PASS OPTION OFFENSES
BROPHYFOOTBALL@GMAIL.COM
WED, SEP 30, 2015
SOURCE: BROPHY
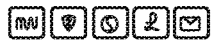
FIG. 15
FIG. 16

UPCOMING EVENTS
EVENTS FROM DATE

———————————————————————— JANUARY 2016 ————————————————————————

2016 AFCA NATIONAL CONVENTION
JANUARY 10, 2016 - JANUARY 13, 2016
HENRY B. GONZALEZ CONVENTION CENTER,
200 E. MARKET STREET
SAN ANTONIO, TX 78205
UNITED STATES

FIND OUT MORE >>

GLAZIER - INDIANAPOLIS 150 FOOTBALL CLINIC
JANUARY 11, 2016 - JANUARY 24, 2016
INDIANAPOLIS MARRIOTT EAST,
7202 EAST 21ST ST.
INDIANAPOLIS, IN 46219
UNITED STATES

FIND OUT MORE >>

<< ALL EVENTS

2016 AFCA NATIONAL CONVENTION

JANUARY 10, 2016 - JANUARY 13, 2016

[ + GOOGLE CALENDAR ]   [ + ICAL EXPORT ]

DETAILS
START:
JANUARY 10, 2016
END:
JANUARY 13, 2016
WEBSITE
CLICK HERE

DETAILS
HENRY B. GONZALEZ CONVENTION CENTER
200 E. MARKET STREET
SAN ANTONIO, TX 78205
UNITED STATES

<< 2016 AFCA NATIONAL CONVENTION          NIKE COY CLINIC - ATLANTA, GA >>

FORUM TOPICS STARTED
VIEWING TOPIC 1 (OF 1 TOTAL)

| FORUM | TOPICS | POSTS | FRESHNESS |
|---|---|---|---|
| SEG<br>STARTED BY: DANIEL IN: - FRONTS & STUNTS | 1 | 2 | 2 MONTHS, 1 WEEK AGO<br>DANIEL |

VIEWING TOPIC 1 (OF 1 TOTAL)

2300

2400

2500

METHOD AND SYSTEM FOR GENERATING AND MANAGING PLAYS IN AN ELECTRONIC FORUM

TECHNICAL FIELD

The present disclosure generally relates to generation and sharing of sports related information and, more particularly to methods and systems for generating and managing sports related plays in an electronic forum.

BACKGROUND

Sports coaches, often, have a requirement of designing/drawing plays and developing strategies, sharing the plays, and collaborating on the play strategies with either players or other team members. Typically, the play strategy creation and sharing is a manual effort. For example, a coach would use a pen and a paper or dry erase marker and white board, and draw a play strategy. The play strategy is then shared with other team members or any other person. Various options of sharing the play strategy exist, such as taking a photograph and sending it to others or manually sharing the hand drawn play strategy with others. However, the manual creation and sharing of the play strategies is very cumbersome and inefficient.

With improvement in technology, few solutions have been developed that provide electronic tools to coaches to collaborate and design play strategies. However, sharing of electronically created play strategies still happens over electronic mail or by other means that require lot of manual intervention.

Therefore, there is a need for overcoming the above shortcomings and generating, sharing and managing plays efficiently in an electronic format.

SUMMARY

Various embodiments of the present disclosure provide systems and methods for generating and managing a play in an electronic forum.

An example method includes drawing the play via an electronic forum. The play includes a plurality of players. The electronic forum includes a plurality of buttons or drawing markers for defining moves of the plurality of players. The method also includes posting the play to the electronic forum. Further, the method includes providing access to the play to a user via the electronic forum. In addition, the method includes receiving an edit to the play from the user. The method also includes editing the play. Further, the method includes providing the edited play.

Another example method includes creating a team. The team includes a plurality of team members. The method also includes generating a play. The play includes a plurality of players. The electronic forum includes a plurality of buttons or drawing markers for defining moves of the plurality of players. Further, the method includes sharing the play with the plurality of team members. The method also includes receiving inputs from at least one team member for editing the play. The method further includes editing the play based on the inputs.

A system includes a processor. The system also includes a memory coupled to the processor. The memory stores instructions which when executed by the processor cause the system to perform a method for generating and managing a play. The method includes drawing the play via an electronic forum. The play includes a plurality of players. The electronic forum includes a plurality of buttons or drawing markers for defining moves of the plurality of players. The method also includes posting the play to the electronic forum. Further, the method includes providing a user with access to the play via the electronic forum. In addition, the method includes receiving an edit to the play from the user. The method also includes editing the play. Further, the method includes providing the edited play.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 4 illustrates a connection page of an electronic forum, in accordance with an example embodiment of the invention;

FIG. 5 illustrates a connection search page of an electronic forum, in accordance with an example embodiment of the invention;

FIG. 6 illustrates a sidebar of an electronic forum, in accordance with an example embodiment of the invention;

FIG. 7 illustrates a main page of an electronic forum, in accordance with an example embodiment of the invention;

FIG. 8 illustrates an example page showing forum sub-subjects of an electronic forum, in accordance with an example embodiment of the invention;

FIG. 9 illustrates an example page showing topics of an electronic forum, in accordance with an example embodiment of the invention;

FIG. 12 illustrates a news main page of an electronic forum, in accordance with an example embodiment of the invention;

FIG. 13 illustrates an exemplary news page of an electronic forum, in accordance with an example embodiment of the invention;

FIG. 14 illustrates a videos main page of an electronic forum, in accordance with an example embodiment of the invention;

FIG. 15 illustrates a blogs main page of an electronic forum, in accordance with an example embodiment of the invention;

FIG. 16 illustrates an exemplary blog page of an electronic forum, in accordance with an example embodiment of the invention;

FIG. 17 illustrates an events main page of an electronic forum, in accordance with an example embodiment of the invention;

FIG. 18 illustrates an exemplary event page of an electronic forum, in accordance with an example embodiment of the invention;

FIG. 19 illustrates navigation through events of an electronic forum, in accordance with an example embodiment of the invention;

Figure 1:
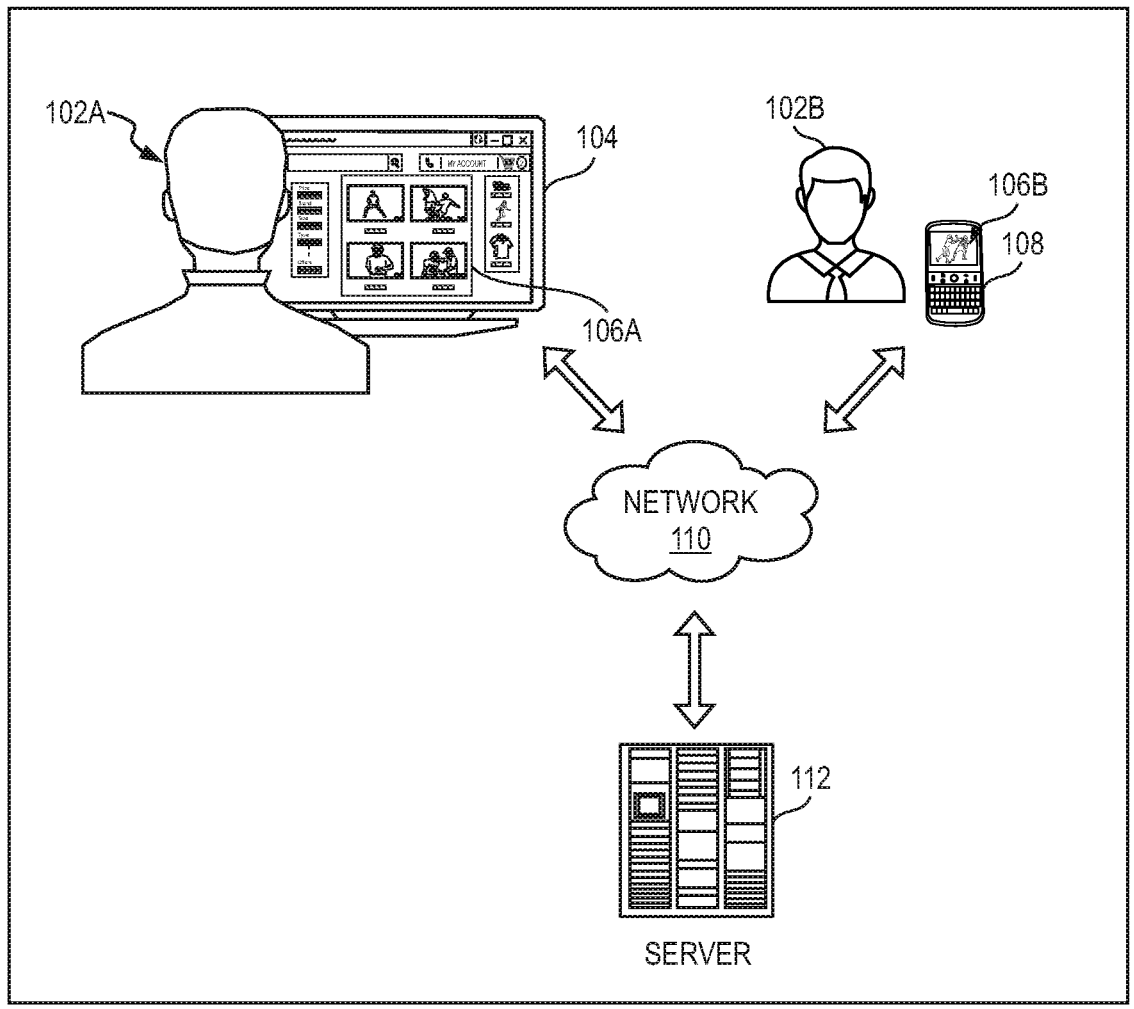
FIG. 1 illustrates an example environment, where various embodiments of the present disclosure may be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Term Descriptions

A play as described herein includes an electronic play including a plurality of players. The play is generated or drawn using an electronic forum. The electronic forum can be an application or a plugin or a website. In one embodiment, the electronic forum may correspond to an online whiteboard or a clipboard based application. The electronic forum provides a plurality of buttons or drawing markers to a user for defining moves of the plurality of players. The play may relate to any game, for example football, cricket, baseball etc. The play can be shared with one or more users. The movements of the play or details of the play includes positioning of the players in a physical field, such as football field, details regarding whether the player is in forward position or a goalkeeper, details regarding how the players will move to execute a strategy or plan etc. It is to be appreciated that the electronic forum supports all minute level of details that the user wants to be generated and shared with other users.

A playbook as described herein includes one or more plays having at least one common characteristic, for example same game, same team, same arrangement of players, a common player, a common country or any other characteristics shared by one or more plays. The playbook can be generated based on inputs received from the user.

A team as described herein includes one or more users that are provided access to a particular play or playbook. The team is created by an administrator user or any other user with appropriate rights. The administrator user then assigns different rights to different users. Based on the assigned rights the access to different portions of the play or playbook is controlled. The assigned rights also indicate if the user can further perform acts of an administrator user or other rights.

A war room is described as an area or page of the electronic forum that provides access to a member(s) of the team. The war room can hold different plays within the playbook feature. The war room also includes notes and other material generated by the team. The war room also has a white board and other functionalities to enable communication and collaboration among team members.

FIG. 1 illustrates an example environment 100, where various embodiments of the present disclosure may be practiced. An example representation of the environment 100 is shown depicting a network 110 that connects entities such as a plurality of users (e.g., users 102A and 102B) and a server 112. The network 110 may be a centralized network or may comprise a plurality of sub-networks that may offer a direct communication between the entities or may offer indirect communication between the entities. Examples of the network 110 include wireless networks, wired networks, and combinations thereof. Some non-exhaustive examples of wireless networks may include wireless local area networks (WLANs), Bluetooth or Zigbee networks, cellular networks and the like. Some non-exhaustive examples of wired networks may include Local Area Networks (LANs), Ethernet, Fiber Optic networks and the like. An example of a combination of wired networks and wireless networks may include the Internet.

The plurality of users may have one or more electronic devices to communicate with other entities of the environment 100 via the network 110. For example, the user 102A is connected to the network 110 via a device 104, and the user 102B is connected to the network 110 via a device 108. The devices may be connected over various types of the network 110, for example a home network, a LAN, a wireless network, a Bluetooth based network, or such other types of network. It is understood that devices 104 and 108 may not be limited to a desktop computer and a mobile phone, respectively, as shown in the environment 100 and that the users may connect to the network using various devices. Examples of the devices include, but are not limited to, laptops, smartphones, tablets, smart watches, smart televisions, smart devices in homes and/or vehicles, and other such systems having capability to access an electronic forum.

In some example embodiments, the server 112 may include one or more processing elements (e.g., computing systems, databases, etc.) to process the information received from the users' devices and to facilitate an electronic forum.

In some example embodiments, the server 112 maintains an infrastructure for hosting applications, such as an electronic forum or an electronic forum application, an instance of which may be installed on the devices of the users. The server 112 is exemplarily depicted to include electronic forum applications 106A and 106B. It is to be appreciated that the terms "electronic forum" or "electronic forum application" is used interchangeably throughout this draft. However, both refer to an electronic portal that enables users to create and manage plays. The users using the electronic forum can interact with the server 112, for example, they can provide data and receive data from the server 112.

It is understood that the functionalities of the server 112 can be embodied in the form of cloud services and/or subscription services.

In one embodiment, the server 112 and one or more devices of the user execute the method as described in present disclosure. In another embodiment, the server 112 receives one or more inputs from the one or more devices of the user and performs the entire method as described in present disclosure. In yet another embodiment, the one or more devices of the user perform entire method as described herein.

The device 104 is depicted to include the electronic forum application 106A. The electronic forum application 106A enables the user 102A to provide data and receive data from the server 112. Similarly, the device 108 is depicted to include the electronic forum application 106B. In one embodiment, the electronic forum application 106A may differ from the electronic forum application 106B, as different versions of the applications may be provisioned based on different devices and the device form-factors. In another embodiment, the electronic forum application 106A may be similar to the electronic forum application 106B and these applications may correspond to mere different instances of same application running on different devices.

In many example scenarios, an electronic forum is required by coaches or team members to create, manage and share plays with other coaches or team members or any other person with which such sharing or collaboration is desired. In such scenarios, one or more software applications are offered for download on respective user devices so as to enable the users (coaches) to perform various activities related to creation, sharing and management of plays. Examples of such activities include, but are not limited to, creation of plays, sharing of plays, managing plays, creating playbooks, sharing playbooks, managing playbooks, creating war rooms, creating teams, managing war rooms, managing teams, editing teams, editing war rooms, editing plays, editing playbooks, and any other activity that relates to play or workflows desired by coaches or users. The devices 104 and 108 are depicted to include such electronic forum applications in form of applications 106A and 106B, respectively. The applications can be installed on the user devices or can be accessed in form of electronic portals or websites using browser applications or browsers.

In some embodiments, the application includes a social media website that allows coaches to collaborate and exchange ideas. The application allows the coaches to draw sports plays on a virtual clipboard offered via the application. The virtual clipboard is also a type of application using which or where users can post formations, configurations, annotations and plays. Other users will be able to view the plays, open the plays, make their own updates and repost them as part of a reply or their own post. The plays allow the users to communicate back and forth complex ideas pictographically.

It is to be appreciated that the terms "users" and "coaches" are used interchangeably to indicate a user of the application.

The application can be offered in various modes, such as a free mode or a premium mode. For example, in free mode the application allows the users to share and discuss the plays in a forum, find news, videos, blogs and sports events, as well as connect with other users to discuss sports topics. As part of a premium service, users are able to save plays to their personal account and share them privately with other users, i.e. their team members. The users are able to organize their plays in to playbooks and each team has a war room where the team members can discuss and make shared plays. In addition, the users can use the virtual clipboard, make and manage connections, use the forum, find the latest news, watch interesting videos, check interesting blogs, find upcoming events, and manage their account.

The application is now explained in detail using following figures.

Figure 2:
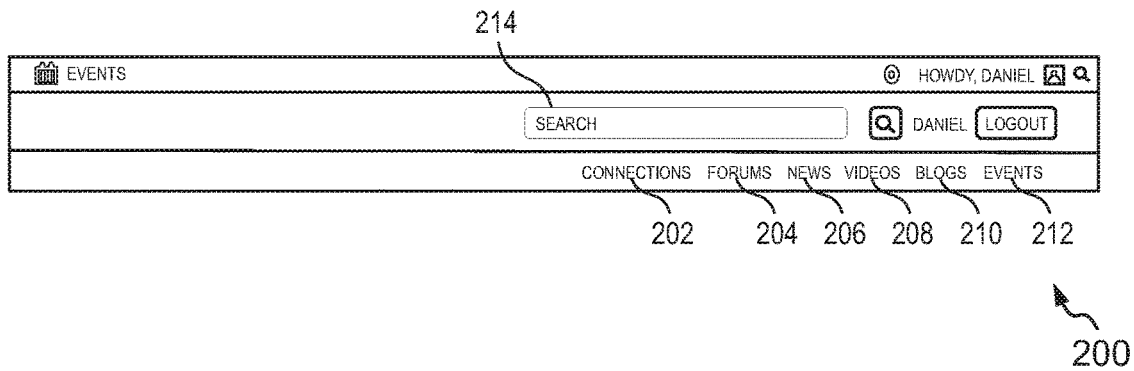
FIG. 2 illustrates a navigation bar of an electronic forum, in accordance with an example embodiment of the invention.

FIG. 2 illustrates a navigation bar 200 of an electronic forum, in accordance with an example embodiment of the invention. The users are able to navigate through various actions or workflows offered by the electronic forum using the navigation bar 200. The navigation bar 200 includes one or more tabs such as "Connections 202", "Forums 204", "News 206", "Videos 208", "Blogs 210", and "Events 212". The navigation bar 200 also includes a search box 214.

Figure 3:
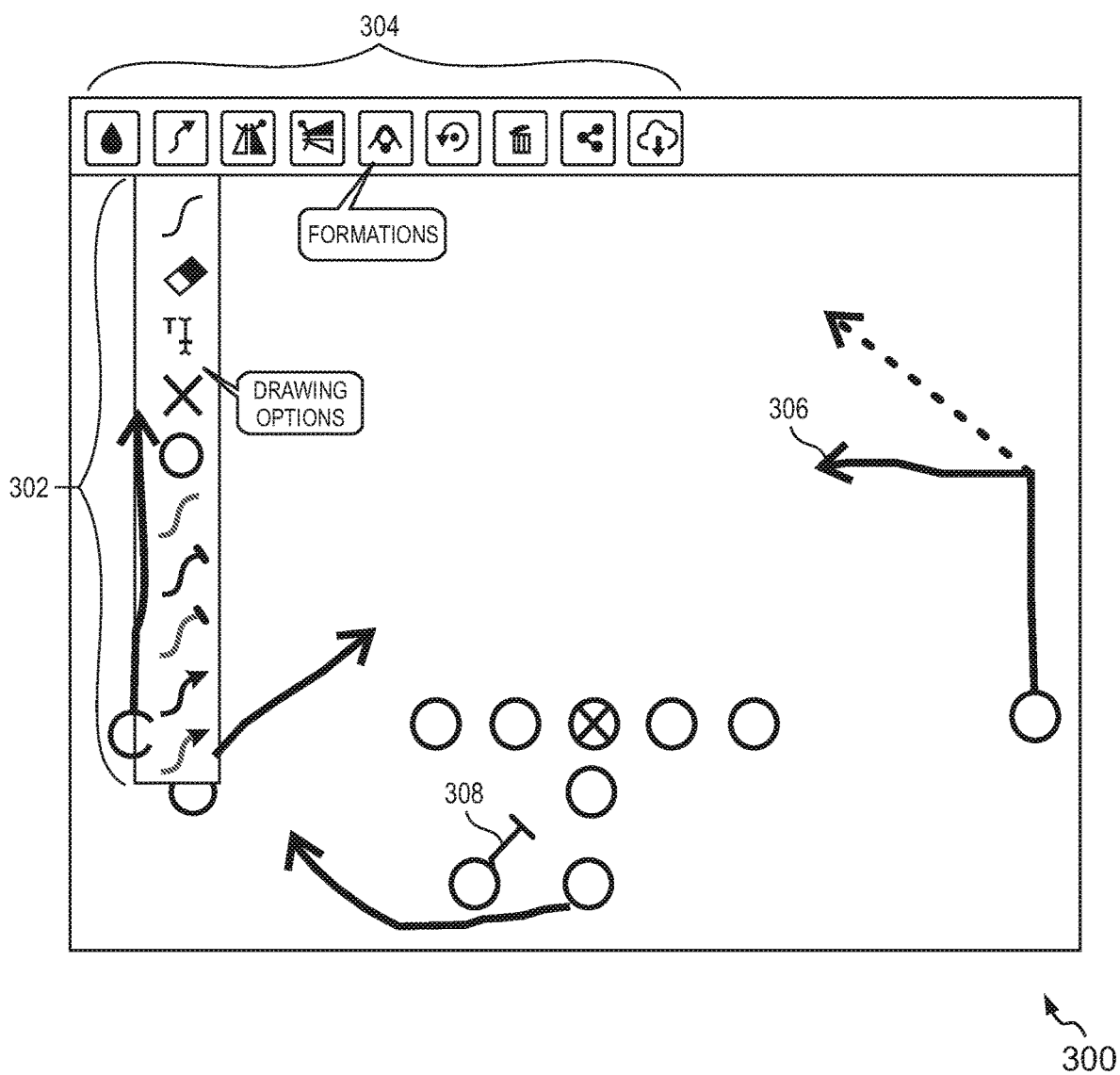
FIG. 3 illustrates a virtual clipboard of an electronic forum, in accordance with an example embodiment of the invention.

FIG. 3 illustrates a virtual clipboard 300 of an electronic forum, in accordance with an example embodiment of the invention. Through the virtual clipboard 300, users are able to draw plays and tactics that they would like to discuss with other users or to save. The virtual clipboard 300 enables the coaches to draw plays on sidelines of most sporting events. The virtual clipboard 300 includes one or more drawing markers 302 or buttons 304 as shown. The virtual clipboard 300 allows users to use frequent symbolism, i.e. offensive players are typically depicted with the letter "o" and defensive player with the letter "x". An arrow 306 and a crossbar 308 are placed at the end of a line to show how players finish their movements. The buttons 304 provide various formations or drawing options to the users. The virtual clipboard 300 also includes different colored markers, custom text for description and annotation, as well as the preset formations and background based on the sport involved. The preset formations allow user to quickly apply standard alignments by position. This allows users to easily place players into standard starting points based upon position. This is especially convenient for coaches as they do not have to start a new play by drawing standard player formations.

FIG. 4 illustrates a connection page 400 of an electronic forum, in accordance with an example embodiment of the invention. The connection page 400 includes a connections section that allows users to connect with other fellow users. The connection section acts as the social wall where users can see what other users are discussing. The connection sections list various connections of the users and provide option 402 to the user to sort connections using various options. The connection page 400 provides options to the users to add others as friends, by clicking the "plus" icon 404, in which case, a request is sent to the second user, so that the other user can confirm if he/she wants to accept the friend request.

To search for a specific person, the user can use the search box 502 as shown in FIG. 5. FIG. 5 illustrates a connection search page 500 of an electronic forum, in accordance with an example embodiment of the invention. The connection search page includes one or more search boxes 504 that give the user multiple options to find a person they're looking for through name, title, level, region, state, offense, defense or combinations of all these items.

FIG. 6 illustrates a sidebar 600 of an electronic forum, in accordance with an example embodiment of the invention. On the sidebar 600, the users are able to see who else is online.

FIG. 7 illustrates a main page 700 of an electronic forum, in accordance with an example embodiment of the invention. The main page 700 allows users to discuss tactics and opinions. The main page 700 is depicted to display example headings in form of forums, topics, posts and freshness. There are three main forum subjects 702: Offense, Defense and Strength & Conditioning. Each of these subjects is composed of sub-subjects 704. The users can create topics, and make posts on them, as well as reply to others' posts. The freshness column helps users know if the topics have been discussed recently or not. After entering a specific subject, users will be able to choose a sub-subject.

FIG. 8 illustrates an example page 800 showing forum sub-subjects of an electronic forum, in accordance with an example embodiment of the invention. The forum subject is exemplarily depicted to be "offense". The users are able to check how many topics each sub-subject, such as for example, "general offense", "passing game", "pass protection" and "running game" has, how many replies, and how long ago discussions in these sub-subjects were last active. After the user enters this sub-subject, the list of topics is displayed to the user.

FIG. 9 illustrates an example page 900 showing topics of an electronic forum, in accordance with an example embodiment of the invention. The topics are exemplarily depicted to correspond to a sub-subject "general offense". The user may view individual posts and replies by clicking on the respective topics. The user may also subscribe to receive notifications by clicking on the subscribe button in order to receive notifications whenever someone contributes to the discussion.

Figure 10:
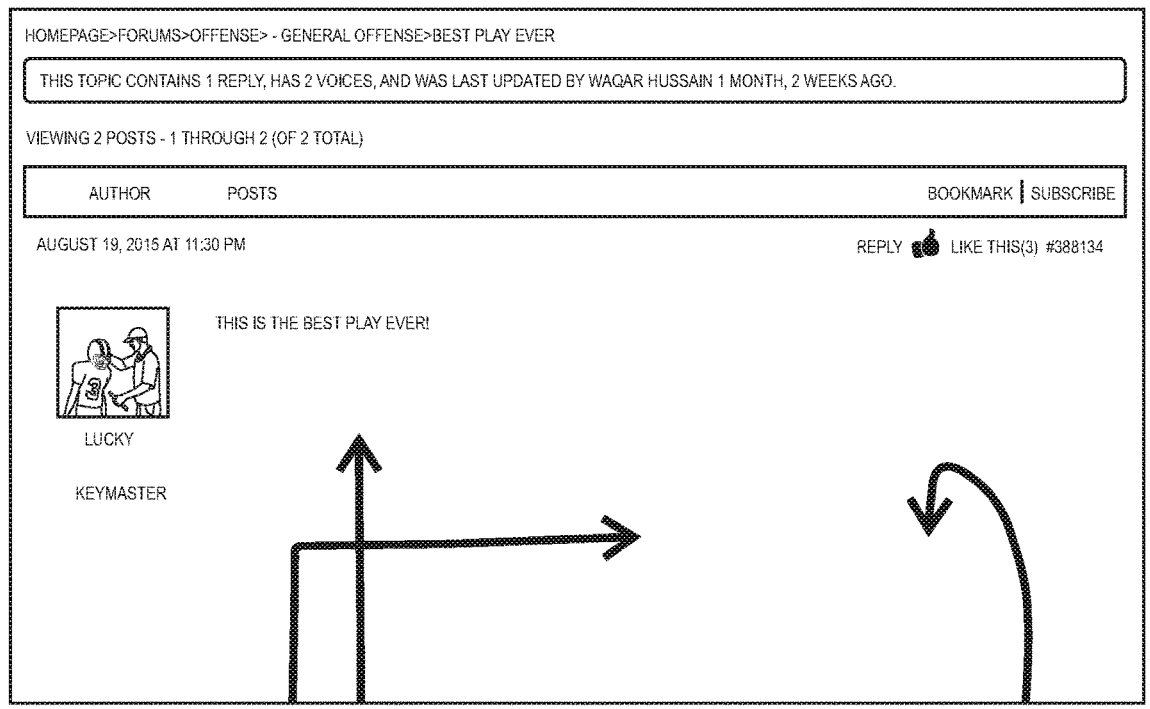
FIG. 10 illustrates example posts related to one or more topics of an electronic forum, in accordance with an example embodiment of the invention.
Figure 11:
FIG. 11 illustrates social sharing options of an electronic forum, in accordance with an example embodiment of the invention.

FIG. 10 illustrates example posts 1000 related to one or more topics of an electronic forum, in accordance with an example embodiment of the invention. The users can subscribe to the topic, bookmark it, reply to it or like it. The users can also share it on some of the main social networks using social sharing options, such as the social sharing options 1100 of FIG. 11. Additionally, users can use tags on the electronic forum, to facilitate search for a specific topic or post at a later point in time. The users can also include in their posts and replies, files that might help them explain their point, or even a clipboard play they have drawn with the virtual clipboard, such as the virtual clipboard 300 explained with reference to FIG. 3.

FIG. 12 illustrates a news main page 1200 of an electronic forum, in accordance with an example embodiment of the invention. The news main page 1200 includes a news section using which users can scroll through the latest sports news. The users can share this news on the main social networks, and if they find one that interests them, they can open it to read it. The source of the news is also provided.

FIG. 13 illustrates an exemplary news page 1300 of an electronic forum, in accordance with an example embodiment of the invention.

FIG. 14 illustrates a videos main page 1400 of an electronic forum, in accordance with an example embodiment of the invention. More specifically, the electronic forum includes a 'videos' section, where users are able to find a large set of videos 1402 related to sports. The users can scroll through this set of videos and choose which ones they would like to watch. The videos are divided into three sections: popular videos, recent videos and featured videos, in order to facilitate users in finding desired videos. The users can initiate play-back of the videos by clicking on the respective video icons.

FIG. 15 illustrates a blogs main page 1500 of an electronic forum, in accordance with an example embodiment of the invention. The blogs section allows users to scroll through relevant sports blogs. By opening one of these blogs, the users are able to see the latest posts that were made there, for example as shown in a blog page 1600 of the electronic forum in FIG. 16.

FIG. 17 illustrates an events main page 1700 of an electronic forum, in accordance with an example embodiment of the invention. The events main page 1700 allows users to find more information about the upcoming events. They can also choose which dates to search events in. When opening one of these events, users are able to see all the relevant information, add the event to Google Calendar, or export it to iCal. They are also able to share the events to the main social networks.

FIG. 18 illustrates an exemplary event page 1800 of an electronic forum, in accordance with an example embodiment of the invention. On a given event, users are able to move on to the next or previous event by clicking arrows 1902 that allows them to navigate as shown in event section 1900 of FIG. 19.

Figure 20:
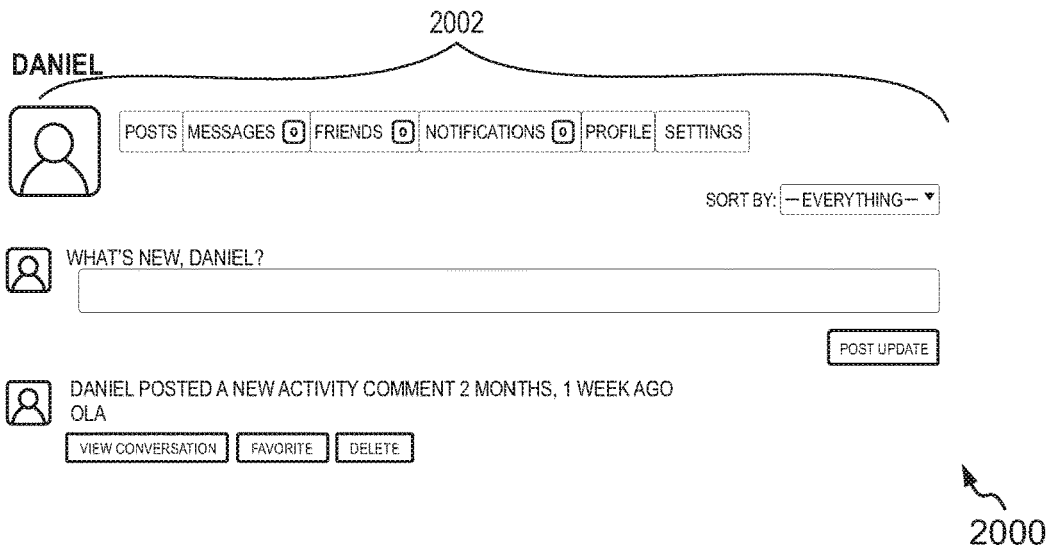
FIG. 20 illustrates an accounts main page of an electronic forum, in accordance with an example embodiment of the invention.
Figure 21:
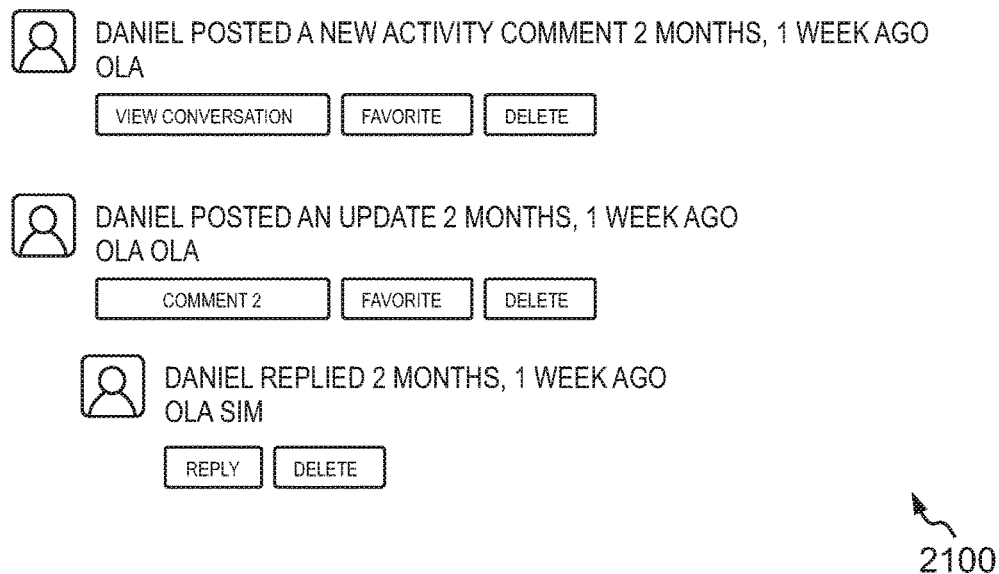
FIG. 21 illustrates activity page of an electronic forum, in accordance with an example embodiment of the invention.

FIG. 20 illustrates an accounts main page 2000 of an electronic forum, in accordance with an example embodiment of the invention. The users also have access to a personal space 2002 as shown on the accounts main page 2000 where they can manage their accounts. They are able to manage their posts, messages, friends, notifications, profile information and settings. When the users open this section, they are able to see their feed, where the latest contributions they have done, or that their friends have done, are visible. They are able to view conversations, mark them as favorites, check comments, make new comments, or delete comments they have done as shown on activity page 2100 of the electronic forum of FIG. 21.

Figure 22:
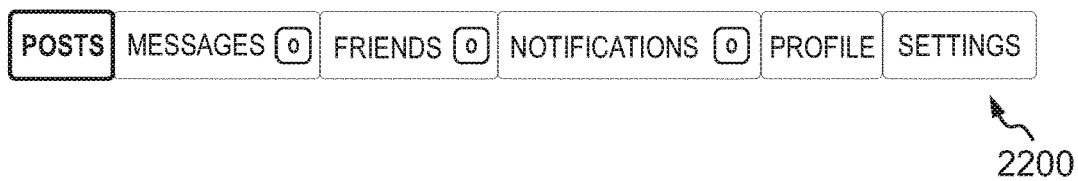
FIG. 22 illustrates a navigation menu of the accounts page of an electronic forum, in accordance with an example embodiment of the invention.

FIG. 22 illustrates a navigation menu 2200 of accounts page of an electronic forum, in accordance with an example embodiment of the invention. The navigation menu 2200 shows tabs for various sections such as posts, messages, friends, notifications, profile and settings.

Figure 23:
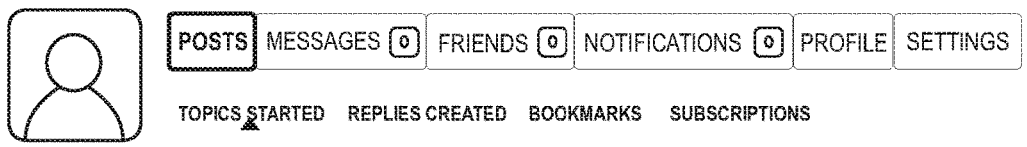
FIG. 23 illustrates a posts section page of an electronic forum, in accordance with an example embodiment of the invention.

FIG. 23 illustrates a posts section page 2300 of an electronic forum, in accordance with an example embodiment of the invention. In the posts section page 2300, users are able to find posts they have participated in. The posts are divided in: Topics started, Replies created, Bookmarks they have done and Subscriptions they have done.

Figure 24:
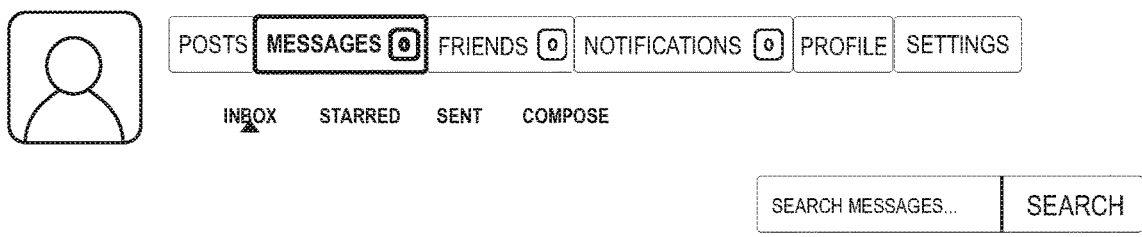
FIG. 24 illustrates a messages section of an electronic forum, in accordance with an example embodiment of the invention.

FIG. 24 illustrates a messages section 2400 of an electronic forum, in accordance with an example embodiment of the invention. The messages section 2400 allows users to check messages they have received, and send new messages to other users. They can also mark certain messages (for example, by using a star) to make them easier to find.

Figure 25:
FIG. 25 illustrates a friends section of an electronic forum, in accordance with an example embodiment of the invention.

FIG. 25 illustrates a friends section 2500 of an electronic forum, in accordance with an example embodiment of the invention. The friends section 2500 is divided in two portions: 1) check the users' Friends or 2) check the requests other users have send them. In this last case, users are able to accept the requests users have sent them.

Figure 26:
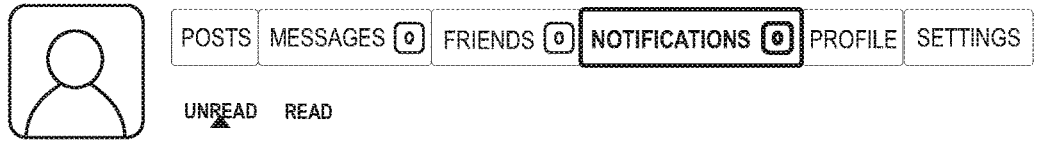
FIG. 26 illustrates a notifications section of an electronic forum, in accordance with an example embodiment of the invention.

FIG. 26 illustrates a notifications section 2600 of an electronic forum, in accordance with an example embodiment of the invention. Using the notification section 2600, the users are able to see their notifications that are read or unread.

Figure 27:
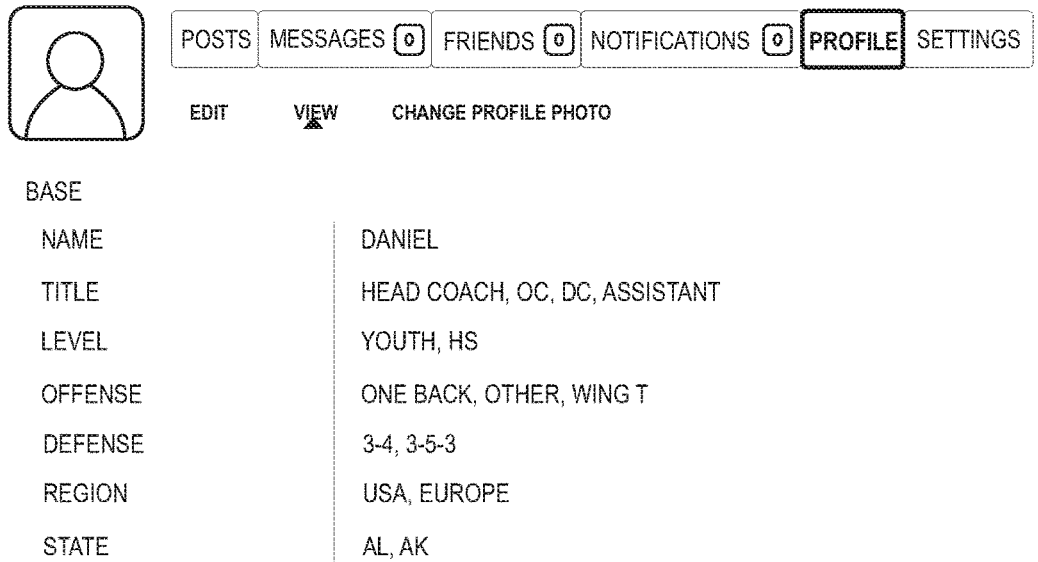
FIG. 27 illustrates a profile section of an electronic forum, in accordance with an example embodiment of the invention.

FIG. 27 illustrates a profile section 2700 of an electronic forum, in accordance with an example embodiment of the invention. The profile section 2700 allows the user to view or edit their profile, including their profile picture.

Figure 28:
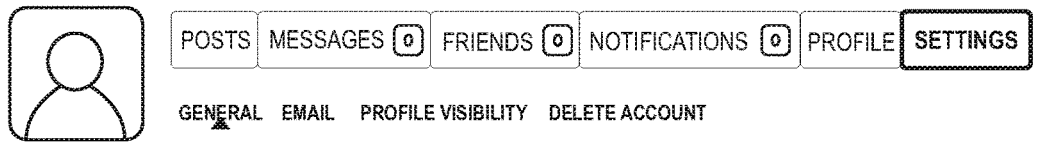
FIG. 28 illustrates a settings section of an electronic forum, in accordance with an example embodiment of the invention.

FIG. 28 illustrates a settings section 2800 of an electronic forum, in accordance with an example embodiment of the invention. Using the settings section 2800, the users are able to change their personal settings, including general settings, email related settings and profile visibility settings. They can also delete their account.

Figure 29:
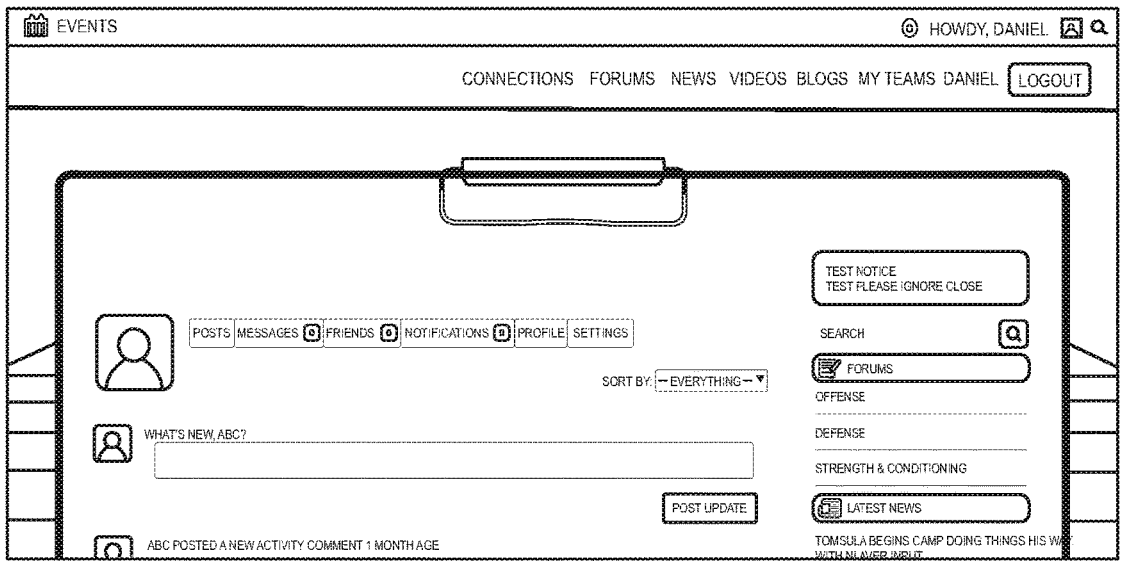
FIG. 29 illustrates team creation page of an electronic forum, in accordance with an example embodiment of the invention.

FIG. 29 illustrates team creation page 2900 of an electronic forum, in accordance with an example embodiment of the invention. In some embodiments, the team creation page 2900 is part of a premium service. As part of the premium service, the users are able to save plays to their personal account and share them privately with other users, i.e. their team members. The users are able to organize their plays in to playbooks and each team has a war room where the team members can discuss and make shared plays. Further, each team has an administrator (also referred to hereinafter as admin), i.e. the user who created the team. This user is able to manage everything about their team, including who is a part of it. Besides the admin, the team has two types of users, i.e. members and leaders. Leaders are able to manage the war room and the playbooks besides the basic functionalities, while members perform the more basic tasks. The admin is also able to make other members as administrators. In some embodiments, in order for the war room to be active, a leader or the admin might have to be present, otherwise, a message may be displayed to the member informing them that the room is closed.

Figure 30:
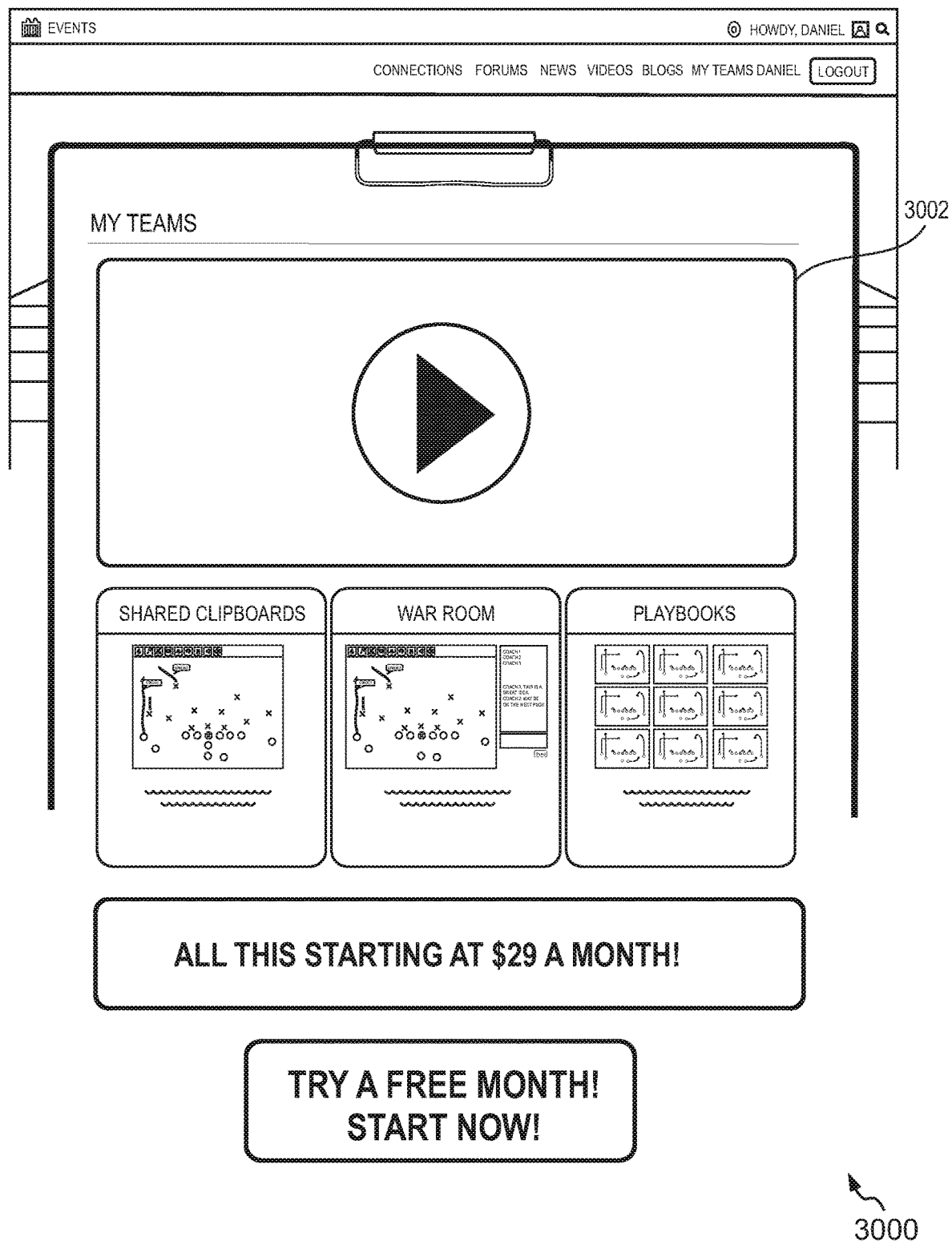
FIG. 30 illustrates an informational screen corresponding to a premium service of an electronic forum displayed to a user, in accordance with an example embodiment of the invention.
Figure 31:
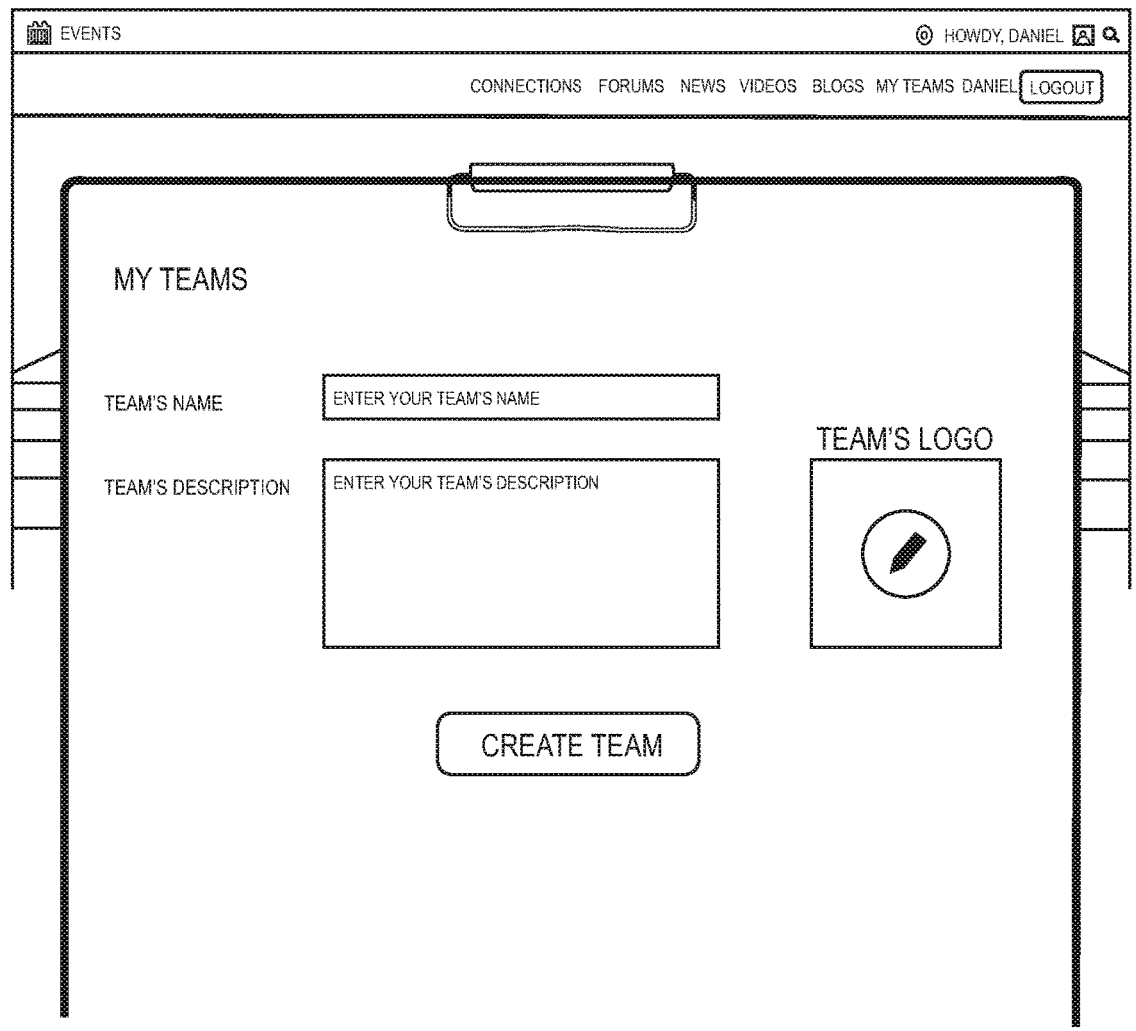
FIG. 31 illustrates yet another team creation page of an electronic forum, in accordance with an example embodiment of the invention.
Figure 32:
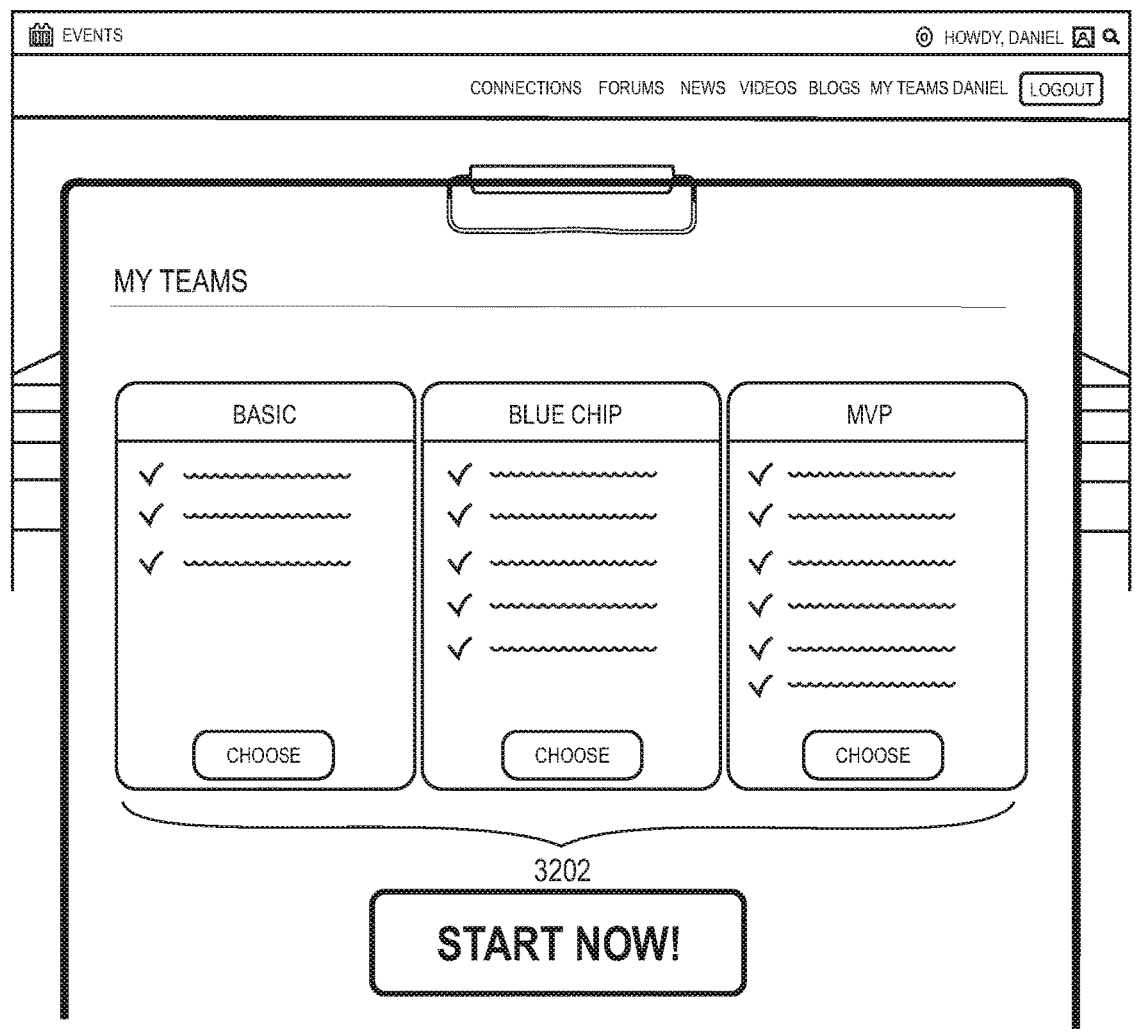
FIG. 32 illustrates still another team creation page of an electronic forum, in accordance with an example embodiment of the invention.
Figure 33:
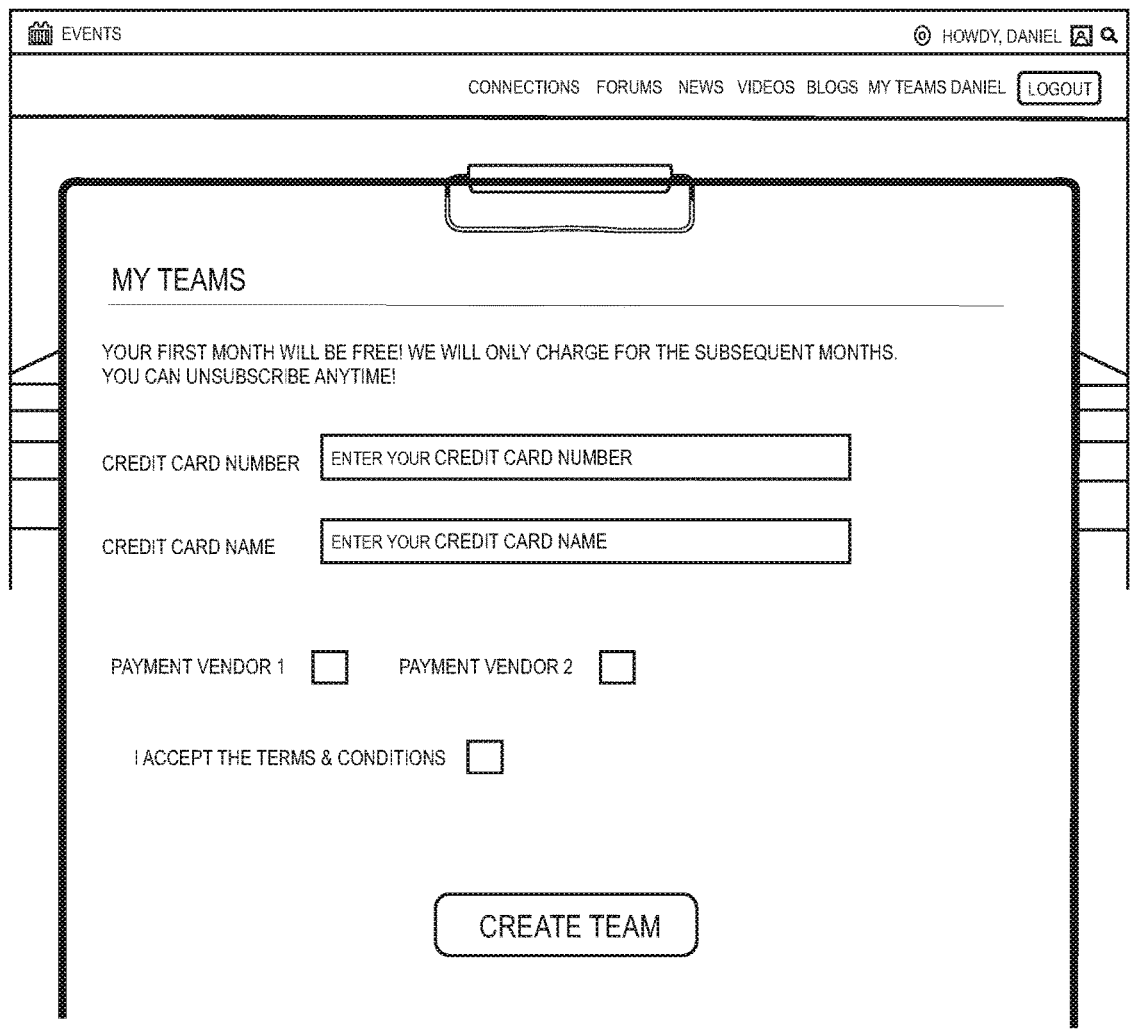
FIG. 33 illustrates still another team creation page of an electronic forum, in accordance with an example embodiment of the invention.

In an embodiment, a link is added to the main navigation page to direct the users to the team creation page 2900. If the user clicks on the link without being a premium customer, an informational screen may appear to explain the advantages of subscribing to the service. The information regarding the premium service is then presented to the user on team creation page 3000 in FIG. 30 trying to sell the server to this user. A free month subscription could be offered, in order to have the users try out this service. An explainer video 3002 can be inserted as shown in the team creation page 3000 to quickly inform the user on the main functionalities the premium service offers. When the user chooses to subscribe, the users are redirected to a team creation page 3100 (shown in FIG. 31), where they are able to create their team. The basic information for creating a team, such as its' name, its' logo and its' description, or other fields that might be essential, are asked to the user. All of this information can later be edited by the admin in the team settings. After this, the user may choose a package that the user likes to buy as shown in team creation page 3200 of FIG. 32. The team creation page 3200 shows three packages 3202 (for example, a basic package, a blue chip package and a MVP package) to choose from, offering different functionalities to the users. Another team creation page, such as the team creation page 3300 of FIG. 33, may then be displayed to the user for the user to provision their credit card information for making payments. User is informed that he is not charged right away, but only after the trial month, in case the user does not unsubscribe. It is understood that the user has to read the terms and conditions in order to proceed.

Figure 34:
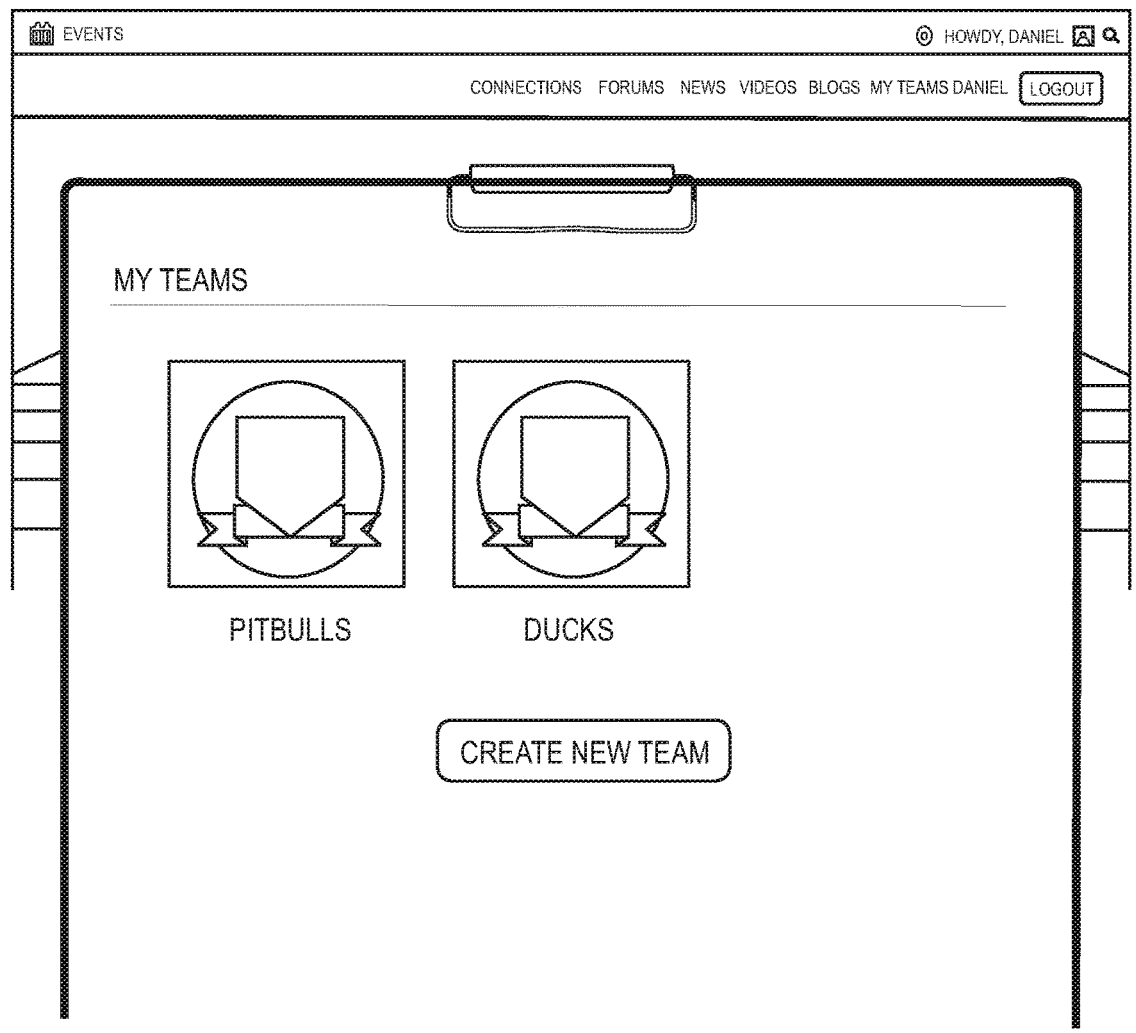
FIG. 34 illustrates a team selection page of an electronic forum, in accordance with an example embodiment of the invention.

Thereafter, the user is redirected to the "My Teams" page, i.e. a team selection page 3400, with the role of Admin, as exemplarily shown in FIG. 34. When the admin enters the team selection page 3400, the admin is able to perform a set of functionalities, namely:

Add and remove users
Change users' role
Create, edit and save plays
Create and manage playbooks
Manage the war room
Manage the team's forum When entering the team selection page 3400, the user has to choose a team. If the user has a team, this operation could be hidden for UX purposes and the "Create new team" button would be placed in the settings, so that they could still create a new team.

Figure 35:
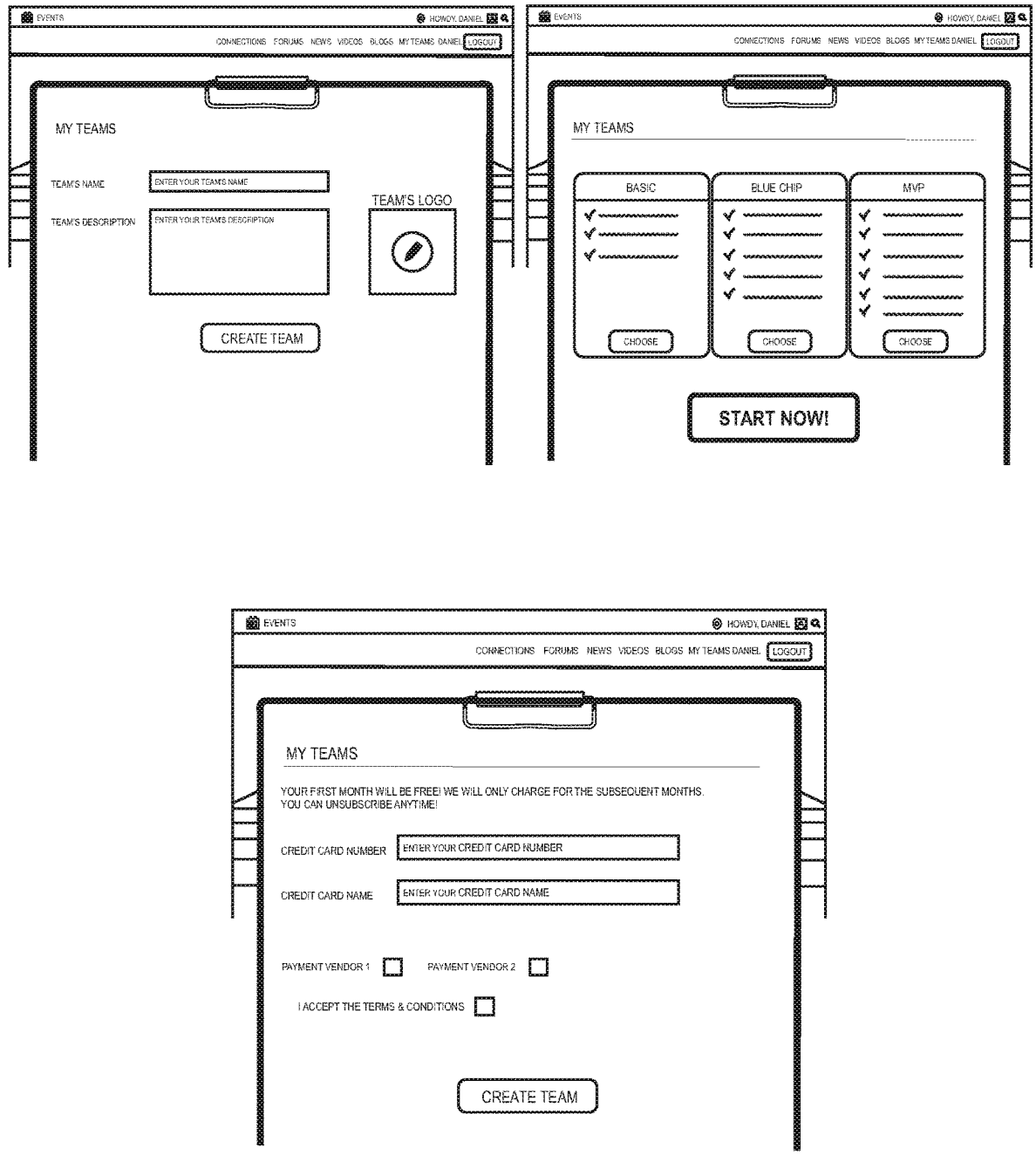
FIG. 35 illustrates a team information input page of an electronic forum, in accordance with an example embodiment of the invention.

A team can be created for each section of the team. For example, the admin could decide to have a team for the offense, one for defense and a general one. If the user chooses to create a new team, the user is redirected to a team information input page, such as a team information input page 3500 shown in FIG. 35, that asks them to insert their team information, followed by the page to choose a package, and the payment page, as mentioned earlier.

Figure 36:
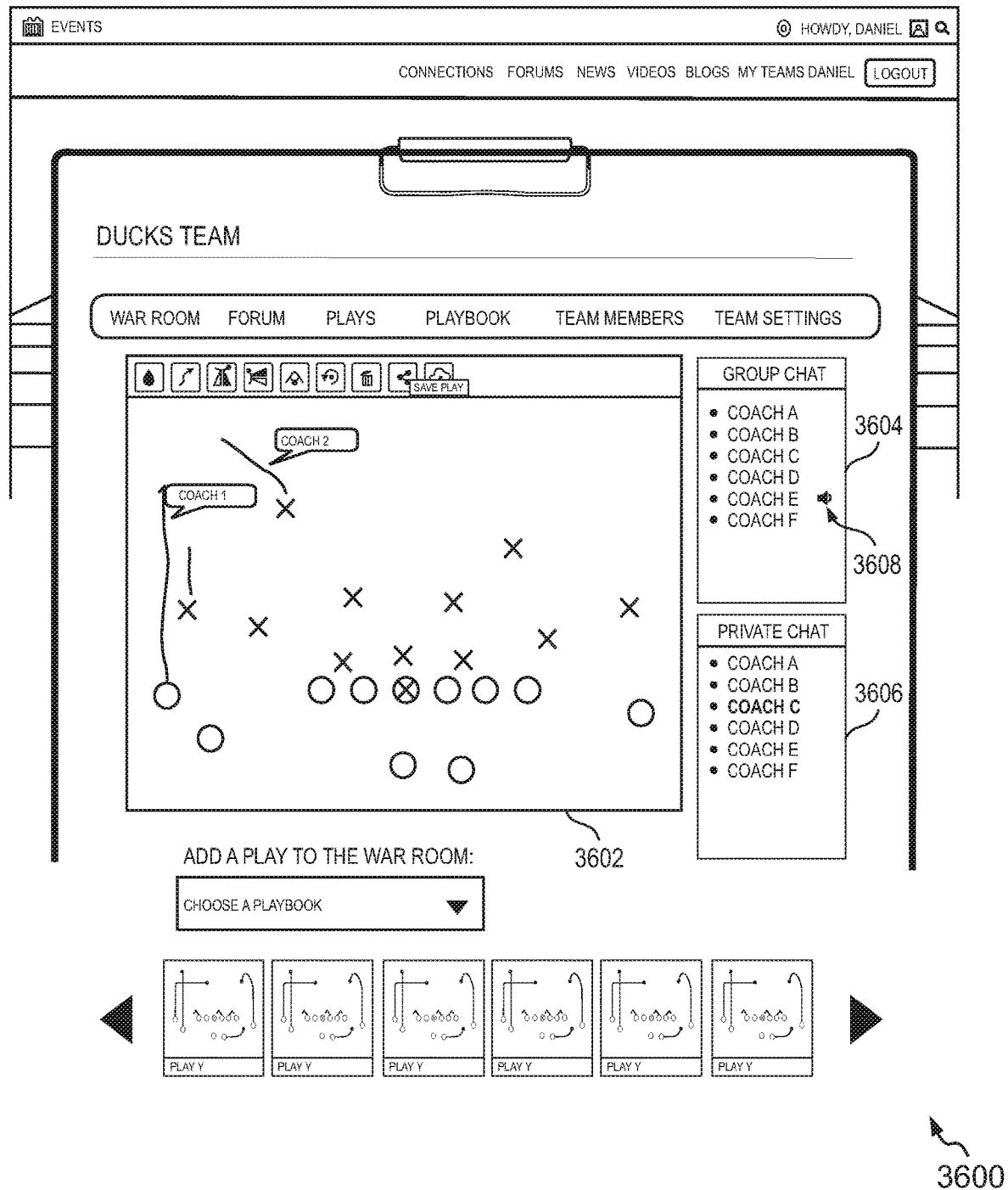
FIG. 36 illustrates a war room page of an electronic forum, in accordance with an example embodiment of the invention.

FIG. 36 illustrates a war room page 3600 of an electronic forum, in accordance with an example embodiment of the invention. The war room 3600 is the place for the team to collaborate and discuss tactics and plays. There is a common board 3602 where the users can draw their plays together. The war room has a group chat box 3604, as well as private chat boxes 3606. It also allows the users to talk through voice as exemplarily depicted using a microphone icon 3608. It is understood that various voice-based technologies, such as Voice over IP (VOIP), may be utilized for facilitating such voice-based interaction. Furthermore, in some embodiments, video based interactions may also be facilitated to enable users to see each other during an ongoing interaction on the electronic forum.

The admin is able to control the war room 3600, as well as the leaders that the admin has chosen. It is important that the clipboard has a "Save" button, so that the current play can be saved before a new one is added to the board. User can save a draft of the play when a new one is added to the board, otherwise the new play may replace the old one and it may never be recovered, if the admin/leaders have forgotten to save it, which might become frustrating to the users. These drafts could be saved in a playbook called "My team's drafts", and the admin and leaders could then choose to either save these plays or delete them. In one embodiment, to avoid saving a lot of unnecessary drafts, only the latest 20 plays may be saved, and the older ones may be deleted.

The war room page 3600 shows two chat rooms: the group chat and the private chat. On the group chat, every member can write and every member can read what is written. On the private chat, two members are discussing only with each other.

Figure 37:
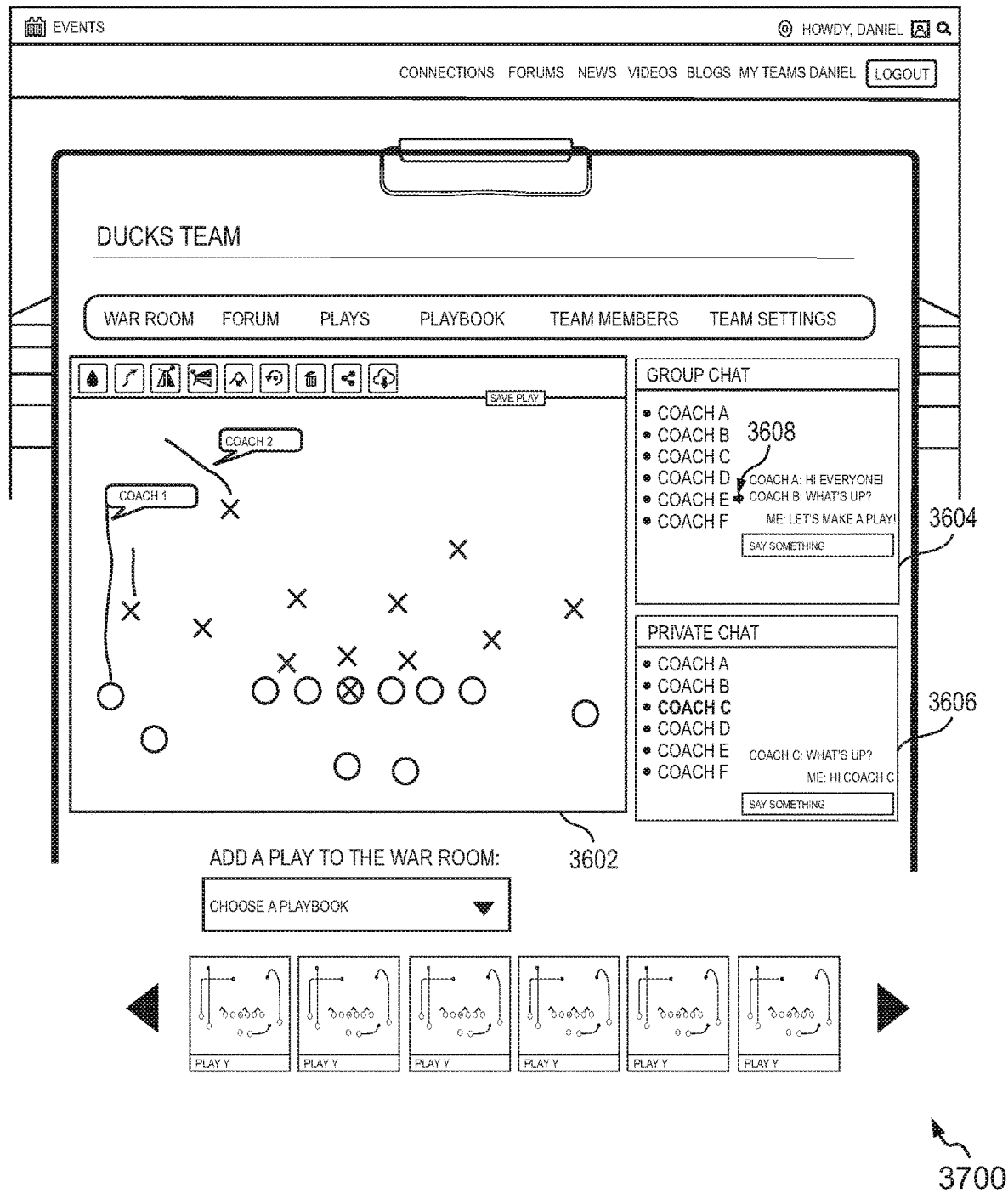
FIG. 37 illustrates another war room page of an electronic forum, in accordance with an example embodiment of the invention.

To make space for the clipboard, the chat windows can be minimized as shown in the war room page 3600 and can expand when the user clicks on one of them as shown in a war room page 3700 of FIG. 37.

Figure 38:
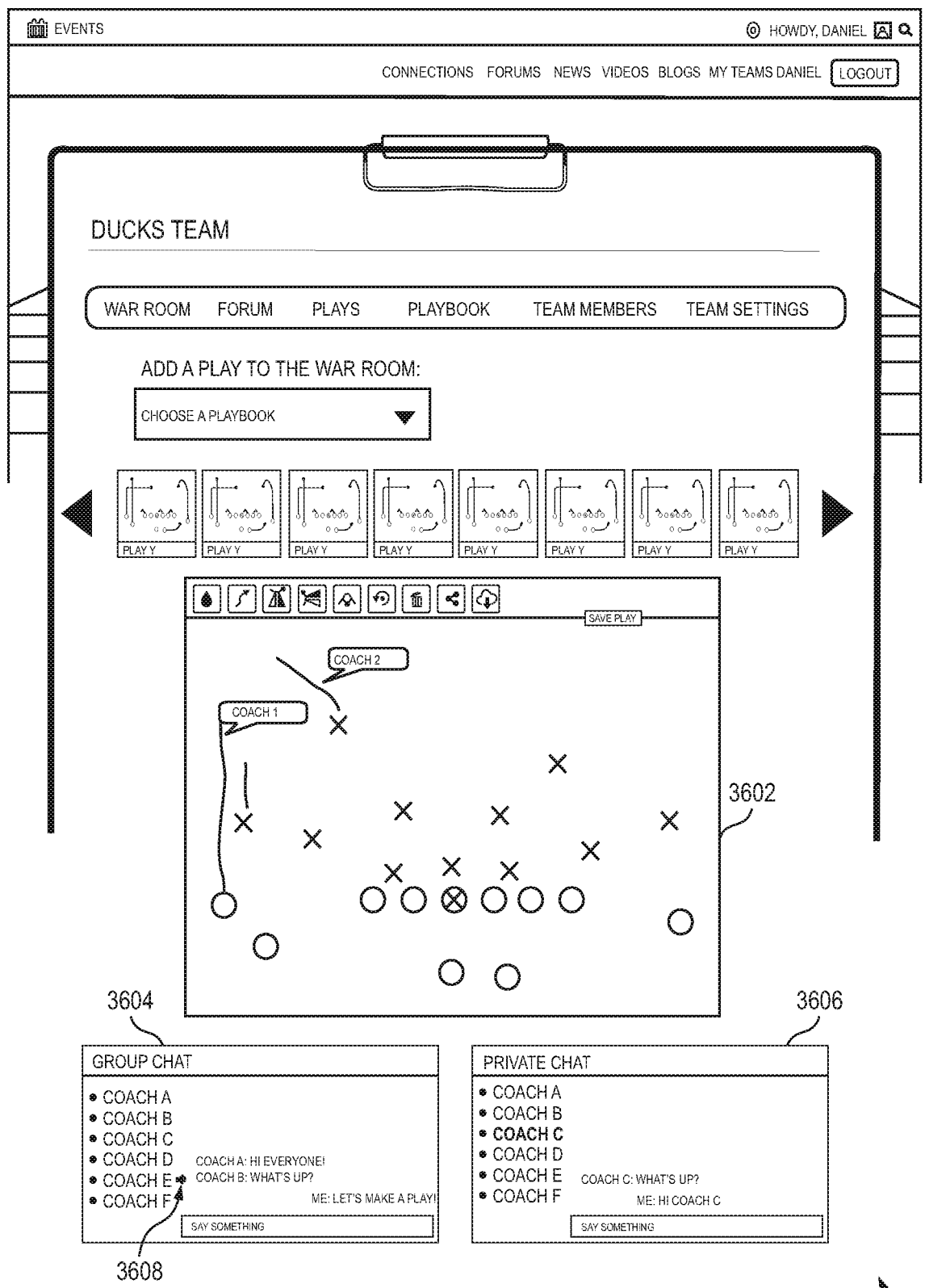
FIG. 38 illustrates war room page of an electronic forum, in accordance with another example embodiment.

To facilitate adding a new play to the war room, one of the team's playbooks could be chosen under the clipboard. Choosing a playbook will present all of the plays in that playbook that can be dragged to the clipboard, to replace the current one. This chosen play could be added to the war room to replace the current one. As mentioned before, it is important that the play that will be replaced is saved as a draft, to prevent frustration in case the user makes a mistake. Another layout option would be to present the place to choose the plays first, followed by the clipboard and then the chat. This way, the chat is given less importance, and is more adaptable for mobile. Such layout is shown in a war room page 3800 of FIG. 38.

Figure 39:
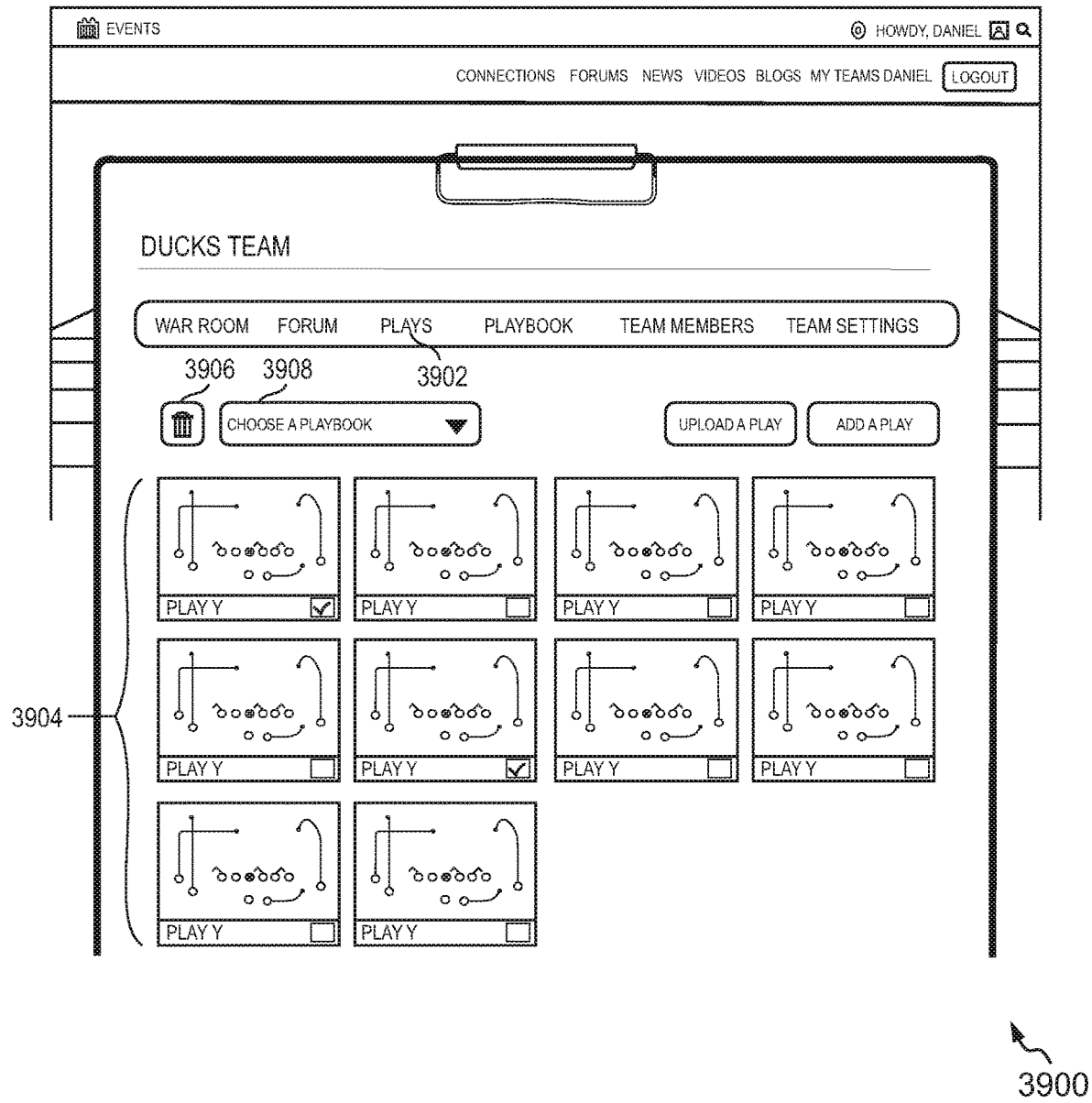
FIG. 39 illustrates plays main page of an electronic forum, in accordance with an example embodiment of the invention.
Figure 40:
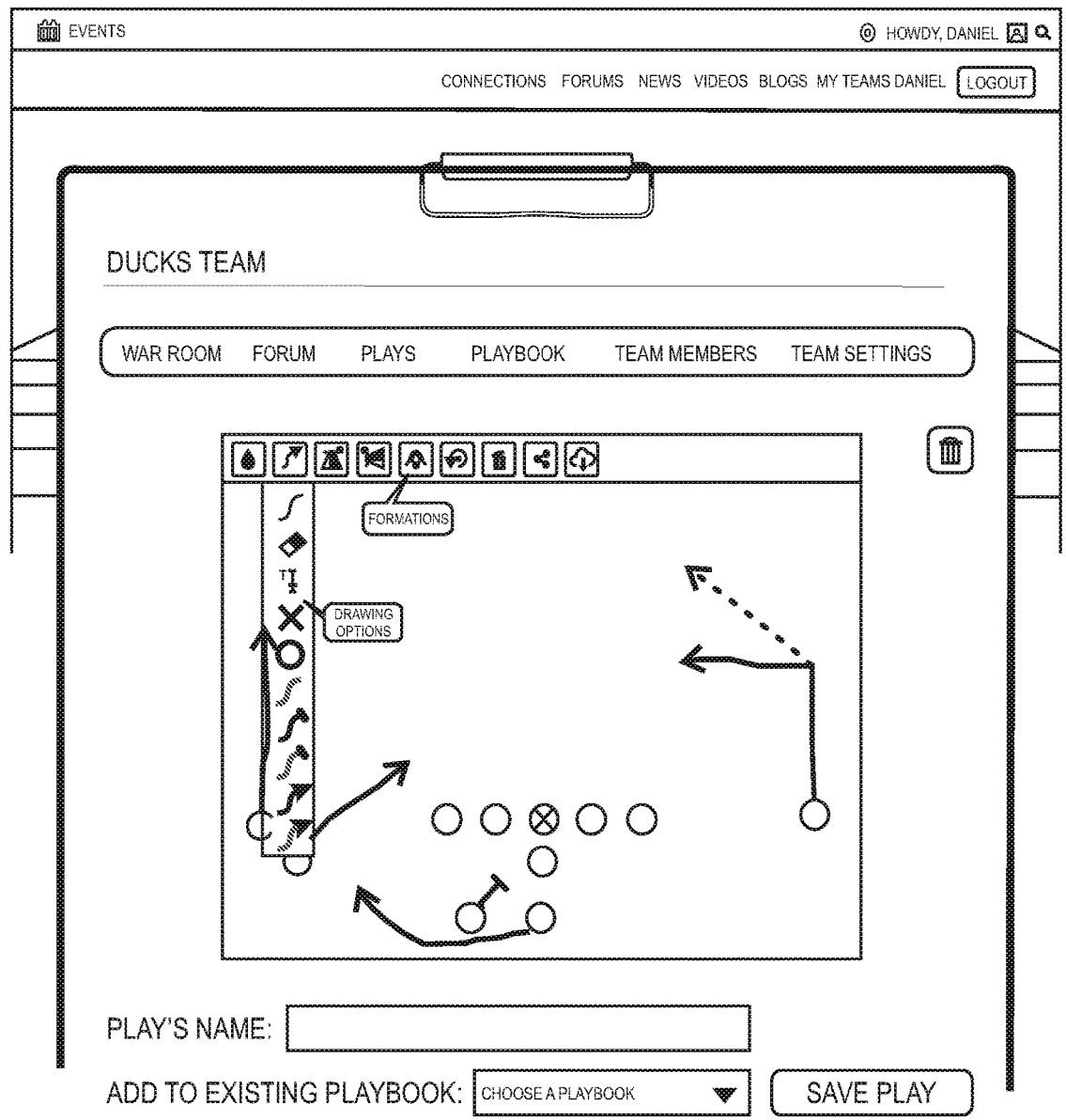
FIG. 40 illustrates a play's creation or editing page of an electronic forum, in accordance with an example embodiment of the invention.

FIG. 39 illustrates plays main page 3900 of an electronic forum, in accordance with an example embodiment of the invention. A plays tab 3902 allows the user to see, edit and create their team's plays. The first screen shows the user, thumbnails 3904 of all the plays they have and a button to add a new one as well as a button to upload a previously saved play. Each play has a select box, and when at least one of those is selected, a delete button 3906 and a "choose a playbook" dropdown 3908 appears. When the user clicks on a play, it opens that play and allows the user to edit it as shown in a play's creation or editing page 4000 of FIG. 40. The editing page may have a save button and a field to insert the name. Accordingly, the editing page 4000 shows a field to insert this play directly into a certain playbook, and also a "delete" button (smaller, on top), in case the user does not longer want that play. A confirmation message may be mandatorily provided before deleting the play, to make sure that the user really wants to delete the play.

Figure 41:
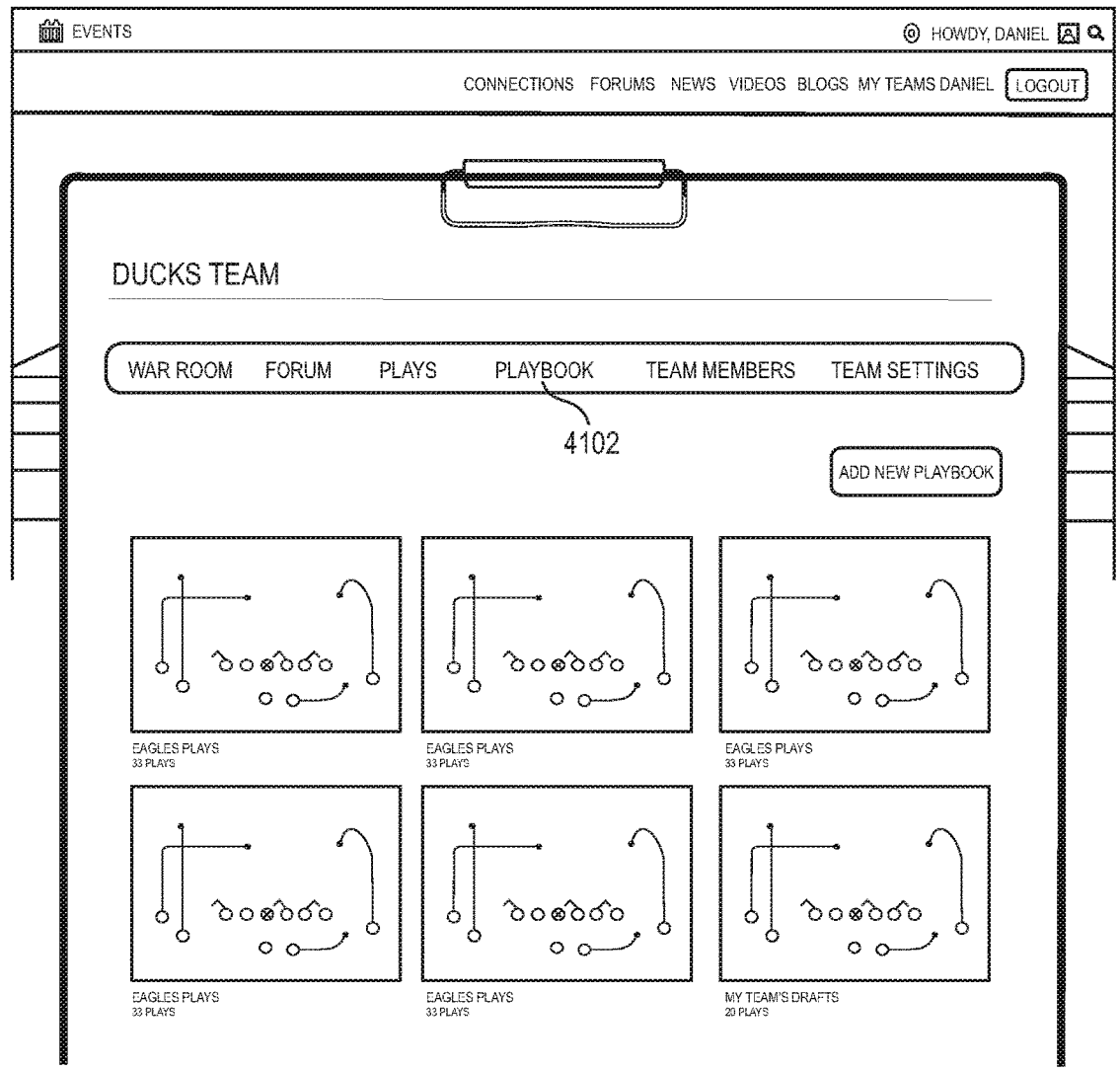
FIG. 41 illustrates a playbooks main page of an electronic forum, in accordance with an example embodiment of the invention.
Figure 42:
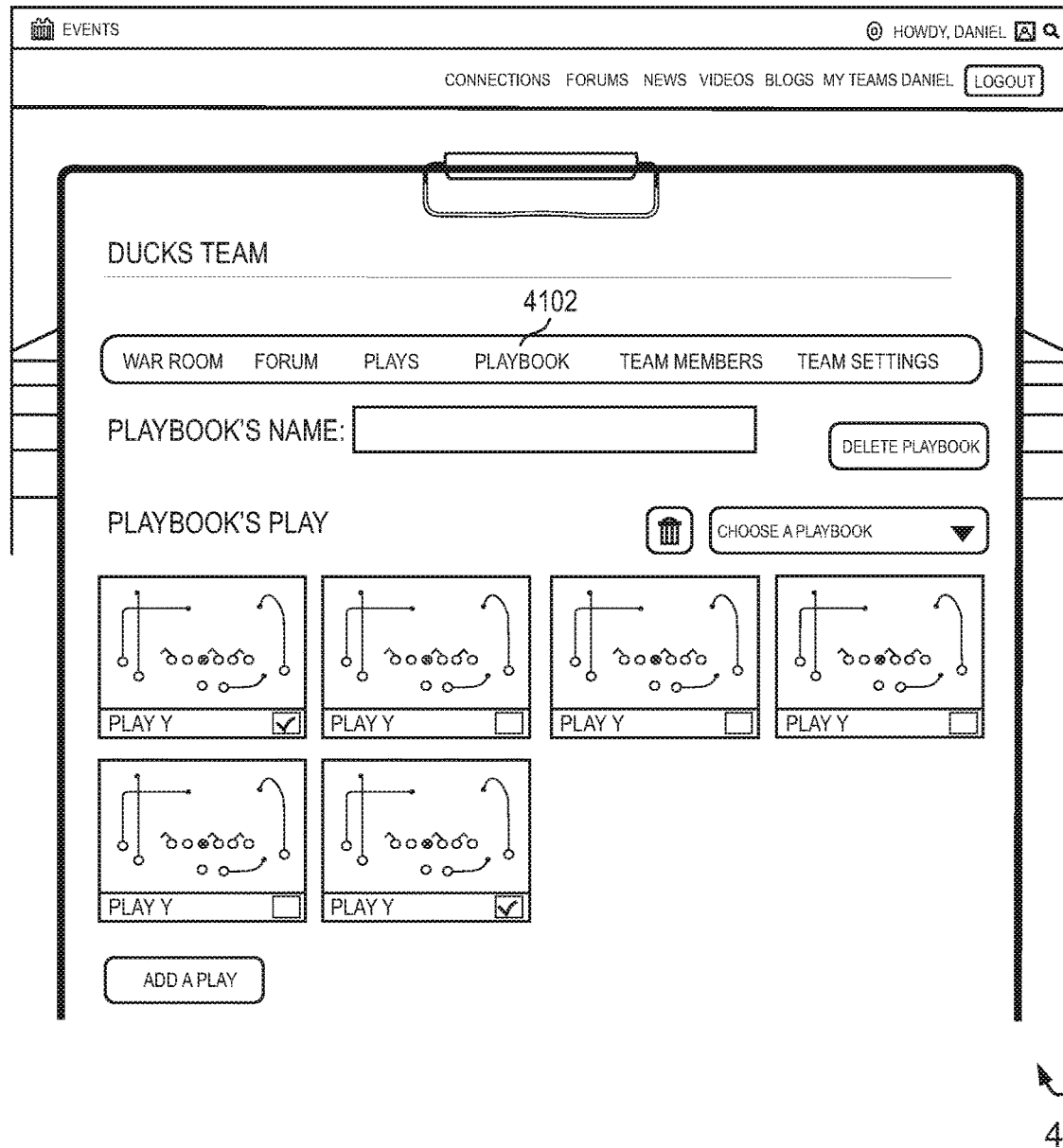
FIG. 42 illustrates a playbooks main page of an electronic forum, in accordance with another example embodiment.
Figure 43:
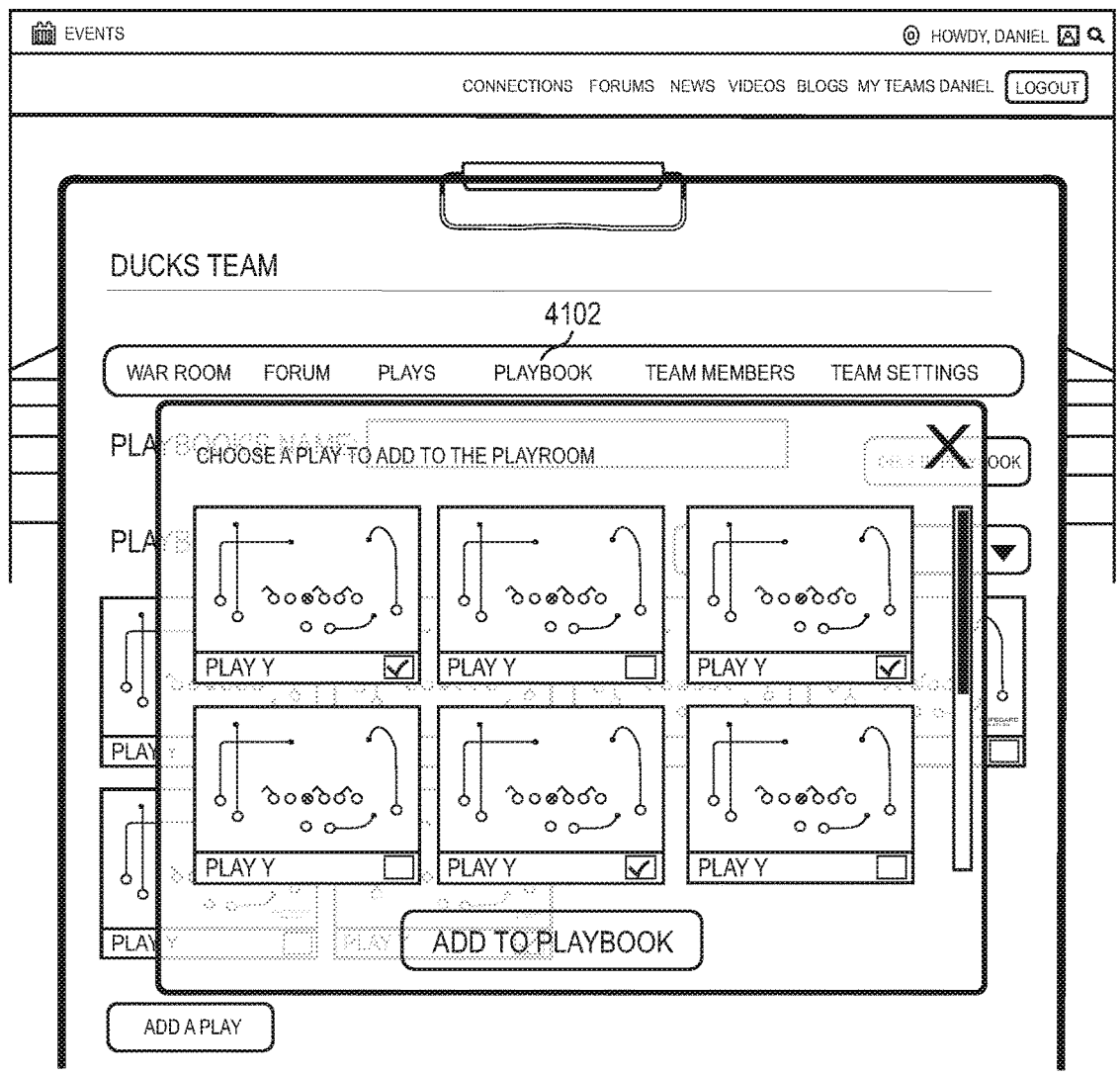
FIG. 43 illustrates a playbook's addition page of an electronic forum, in accordance with an example embodiment of the invention.

FIG. 41 illustrates a playbooks main page 4100 of an electronic forum, in accordance with an example embodiment of the invention. A playbook tab 4102 allows the user to manage their team's playbooks. A playbook is a set of plays, organized together due to something characteristic they have in common. The playbooks can serve to organize the team into groups. Another aspect where these playbooks will be helpful will be to gather all the plays of a certain future game. The initial screen allows the user to see their playbooks and add a new one. As in the plays page, if the user selects one or more playbooks, a delete button would appear so they could choose to delete them as shown in another playbooks main page 4200 of FIG. 42. A confirmation message may be provided before deleting the playbook, to make sure that the user really wants to delete the playbook. The last playbook may be the "drafts" playbook that would include the drafts that have been saved from the war room. When clicking on "Add a new playbook" or on one of the playbooks, the user will be redirected to a new screen, i.e. a playbook's addition page 4300 of FIG. 43 that allows the user to create/edit the playbook, by adding/changing its' name and adding/removing plays from it. When clicking to "Add a play", a pop-up/modal will appear so that the user can choose a play to add. The user can click on more than one play to add to the playbook and then choose to add them.

Figure 44:
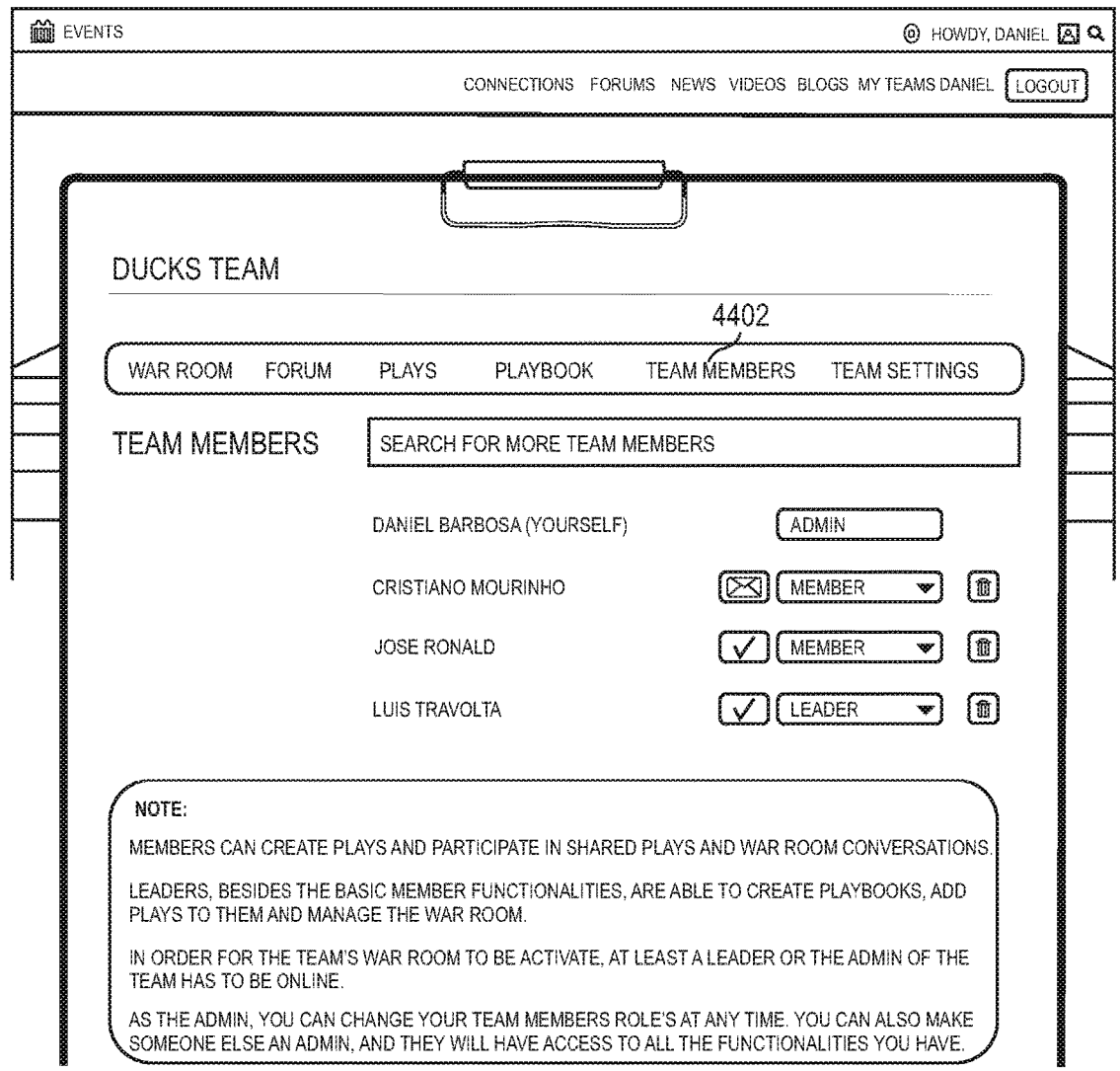
FIG. 44 illustrates a team member management page of an electronic forum, in accordance with an example embodiment of the invention.
Figure 45:
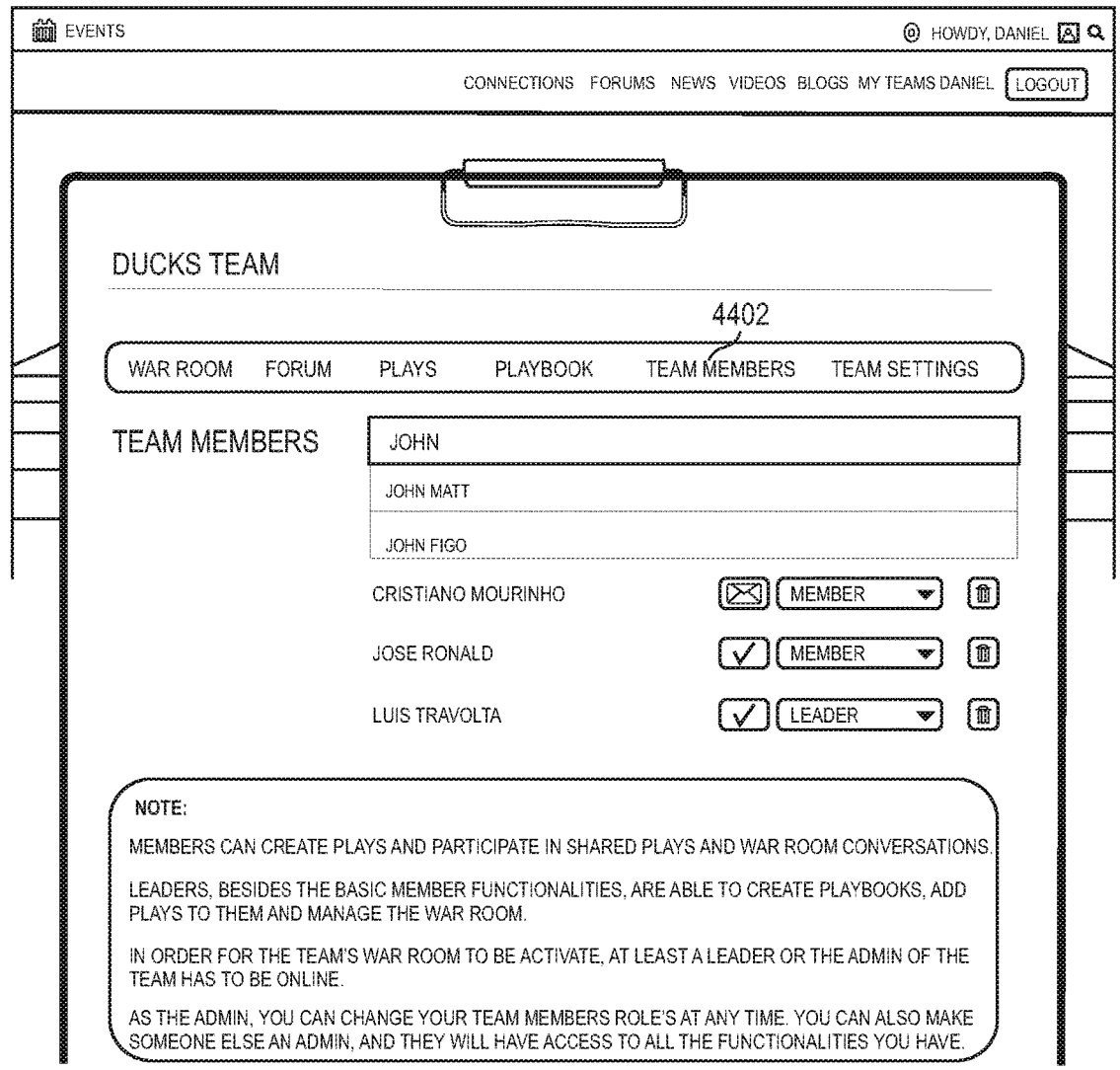
FIG. 45 illustrates another team member management page of an electronic forum, in accordance with example embodiment.

FIG. 44 illustrates a team member management page 4400 of an electronic forum, in accordance with an example embodiment of the invention. A team members tab 4402 will allow the admin to control who is on the team and what role they have. The team member management page 4400 makes it easy for a user to add new users by either searching by their name, mail or username. At some point in the page, there is an explanation of the existing user roles and the functionalities each of them allows. When a user is added, they are sent a message to confirm if they want to be on this team. In this case, the icon of a message appears next to the member. If the admin clicks on it, it will resend the message (in some embodiments, a confirmation may be sought from the admin if he/she truly wishes to resend the message before doing so). If they have already accepted, the check icon would be visible next to that member. When the admin searches through the search box, the list of users that correspond to that name/nickname/email will appear. By clicking on them, the user will be added to the team as shown in a team member management page 4500 of FIG. 45.

Figure 46:
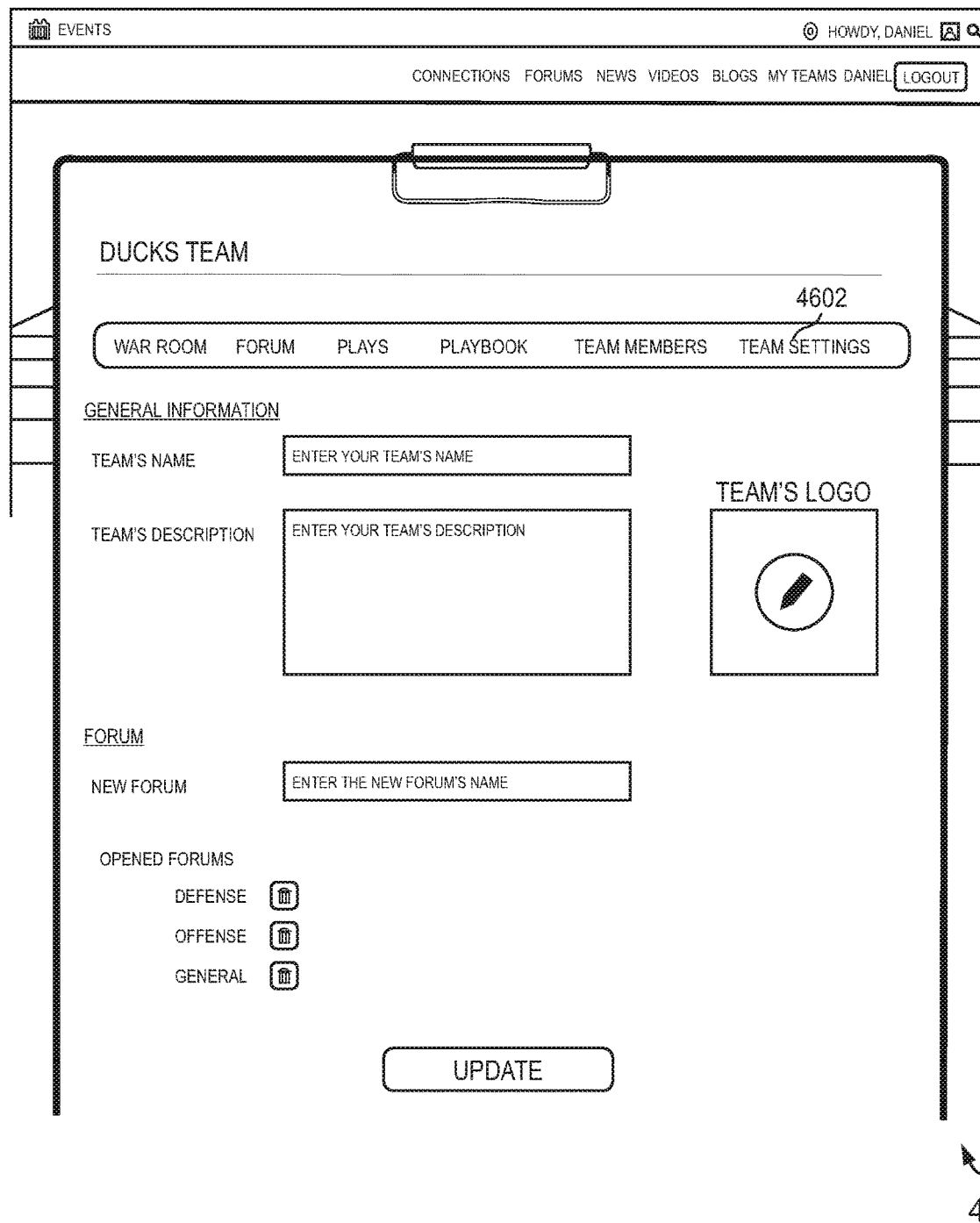
FIG. 46 illustrates a team setting page of an electronic forum, in accordance with an example embodiment of the invention.

FIG. 46 illustrates a team setting page 4600 of an electronic forum, in accordance with an example embodiment of the invention. A team settings tab 4602 will allow the admin to manage certain aspects of their team, namely:

Team's name
Team's Description
Team's logo
Existent forums

When users are added to a team, they are given a role. They can either be leaders or members. According to this role, they will be allowed to perform different tasks. The screens for each kind of user are designed accordingly to the functionalities they are allowed to use. For example, in one embodiment, the tabs for these roles will only include the following sections: war room, forum, plays and playbook. In another embodiment, the war room will be the same for the leaders, as it is designed for the admins. In yet another embodiment, the war room will be presented differently for the members as they won't be able to add plays to the clipboard, nor silence users. Further, the users may not be able to enter the war room if there is not an admin or a leader online. In that case, a window may be presented informing the user that he/she cannot enter the war room at that time.

Figure 47:
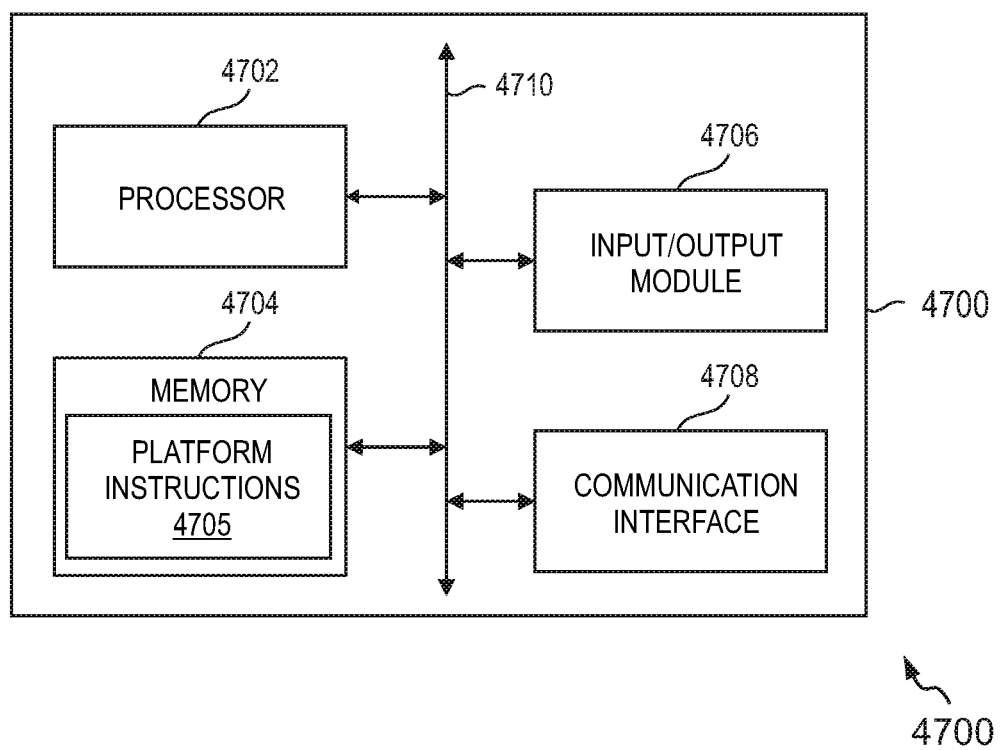
FIG. 47 illustrates a system for implementing the electronic forum and performing methods described herein, in accordance with an example embodiment of the invention.

FIG. 47 illustrates a system 4700 for implementing the electronic forum and performing methods described herein, in accordance with an example embodiment of the invention.

The system 4700 includes at least one processor such as a processor 4702 and at least one memory such as a memory 4704. The system 4700 also includes an I/O module 4706 and a communication interface 4708. The system 4700 can be embodied in the server 112, or it may be deployed in any user device such as the user device 104, or the user device 108 explained with reference to FIG. 1.

Although the system 4700 is depicted to include only one processor 4702, the system 4700 may include more number of processors therein. In an embodiment, the memory 4704 is capable of storing platform instructions 4705, where the platform instructions 4705 are machine executable instructions associated with generating and managing plays in an electronic forum. Further, the processor 4702 is capable of executing the stored platform instructions 4705. In an embodiment, the processor 4702 may be embodied as a multi-core processor, a single core processor, or a combination of one or more multi-core processors and one or more single core processors. For example, the processor 4702 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 4702 may be configured to execute hard-coded functionality. In an embodiment, the processor 4702 is embodied as an executor of software instructions, wherein the instructions may specifically configure the processor 4702 to perform the algorithms and/or operations described herein when the instructions are executed.

The memory 4704 may be embodied as one or more volatile memory devices, one or more non-volatile memory devices, and/or a combination of one or more volatile memory devices and non-volatile memory devices. For example, the memory 4704 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The system 4700 also includes an input/output module 4706 (hereinafter referred to as 'I/O module 4706') for providing an output and/or receiving an input. The I/O module 4706 is configured to be in communication with the processor 4702 and the memory 4704. Examples of the I/O module 4706 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 4702 may include I/O circuitry configured to control at least some functions of one or more elements of the I/O module 4706, such as, for example, a speaker, a microphone, a display, and/or the like. The processor 4702 and/or the I/O circuitry may be configured to control one or more functions of the one or more elements of the I/O module 4706 through computer program instructions, for example, software and/or firmware, stored on a memory, for example, the memory 4704, and/or the like, accessible to the processor 4702.

The communication interface 4708 may enable the system 4700 to communicate with other devices such as users' devices, and the server 112. The communication interface 4708 may be configured to communicate to various types of networks such as the network 110 as explained with reference to FIG. 1.

In an embodiment, various components of the system 4700, such as the processor 4702, the memory 4704, the I/O module 4706 and the communication interface 4708 are configured to communicate with each other via or through a centralized circuit system 4710. The centralized circuit system 4710 may be various devices configured to, among other things, provide or enable communication between the components (4702-4708) of the system 4700. In certain embodiments, the centralized circuit system 4710 may be a central printed circuit board (PCB) such as a motherboard, a main board, a system board, or a logic board. The centralized circuit system 4710 may also, or alternatively, include other printed circuit assemblies (PCAs) or communication channel media.

It is understood that the system 4700 as illustrated and hereinafter described is merely illustrative of a system that could benefit from embodiments of the invention and, therefore, should not be taken to limit the scope of the invention. It is noted that the system 4700 may include fewer or more components than those depicted in FIG. 47. In an embodiment, the system 4700 may be implemented as a platform including a mix of existing open systems, proprietary systems and third party systems. In another embodiment, the system 4700 may be implemented completely as a platform including a set of software layers on top of existing hardware systems. In an embodiment, one or more components of the system 4700 may be deployed in a web server. In another embodiment, the system 4700 may be a standalone component in a remote machine connected to a communication network (such as the network 110 explained with reference to FIG. 1) and capable of executing a set of instructions (sequential and/or otherwise). Moreover, the system 4700 may be implemented as a centralized system, or, alternatively, the various components of the system 4700 may be deployed in a distributed manner while being operatively coupled to each other. In an embodiment, one or more functionalities of the system 4700 may also be embodied as a client within devices, such as users' devices. In another embodiment, the system 4700 may be a central system that is shared by or accessible to each of such devices.

Figure 48:
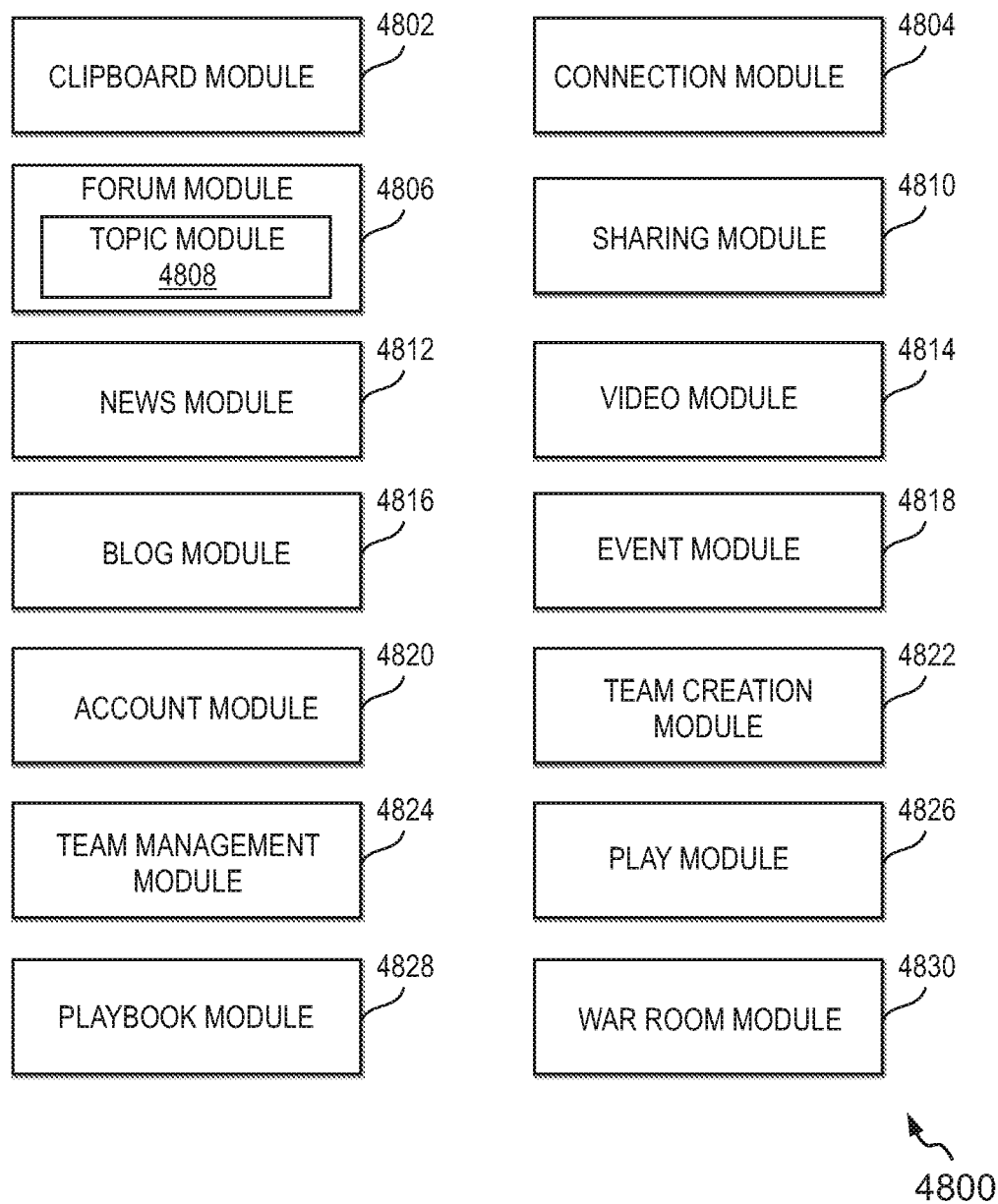
FIG. 48 depicts an example system for generating and managing one or more plays, in accordance with an example embodiment of the invention.

FIG. 48 depicts an example system 4800 for generating and managing one or more plays, in accordance with an example embodiment of the invention. The system 4800 is an example representation of modules implemented in either the server 112 or the user device 104 or the user device 108 or in both. The system 4800 includes one or more modules. A clipboard module 4802 provides options for creating and managing clipboard. A connection module 4804 provides options for creating and managing connections of a user. A forum module 4806 provides options for creating and managing forum. The forum module 4806 also includes a topic module 4808 for creating and managing topics. A sharing module 4810 provides options for sharing content via social means. A news module 4812 provides options for providing news to the users. A video module 4814 provides set of videos to the users for viewing. A blog module 4816 provides options to blog and to read blogs to the users. An event module 4818 provides options to find events, and to create and share events with others. An account module 4820 facilitates creation and management of account by the user. A team creation module 4822 provides option for team creation. A team management module 4824 provides options for managing content for team sharing and managing team. A play module 4826 provides options for creation and management of plays. A playbook module 4828 provides options for creation and management of playbooks. A war room module 4830 provides options for creation and management of war rooms.

The details of the options provided by each module are explained in detail in conjunction with FIGS. 3 to 46.

Figure 49:
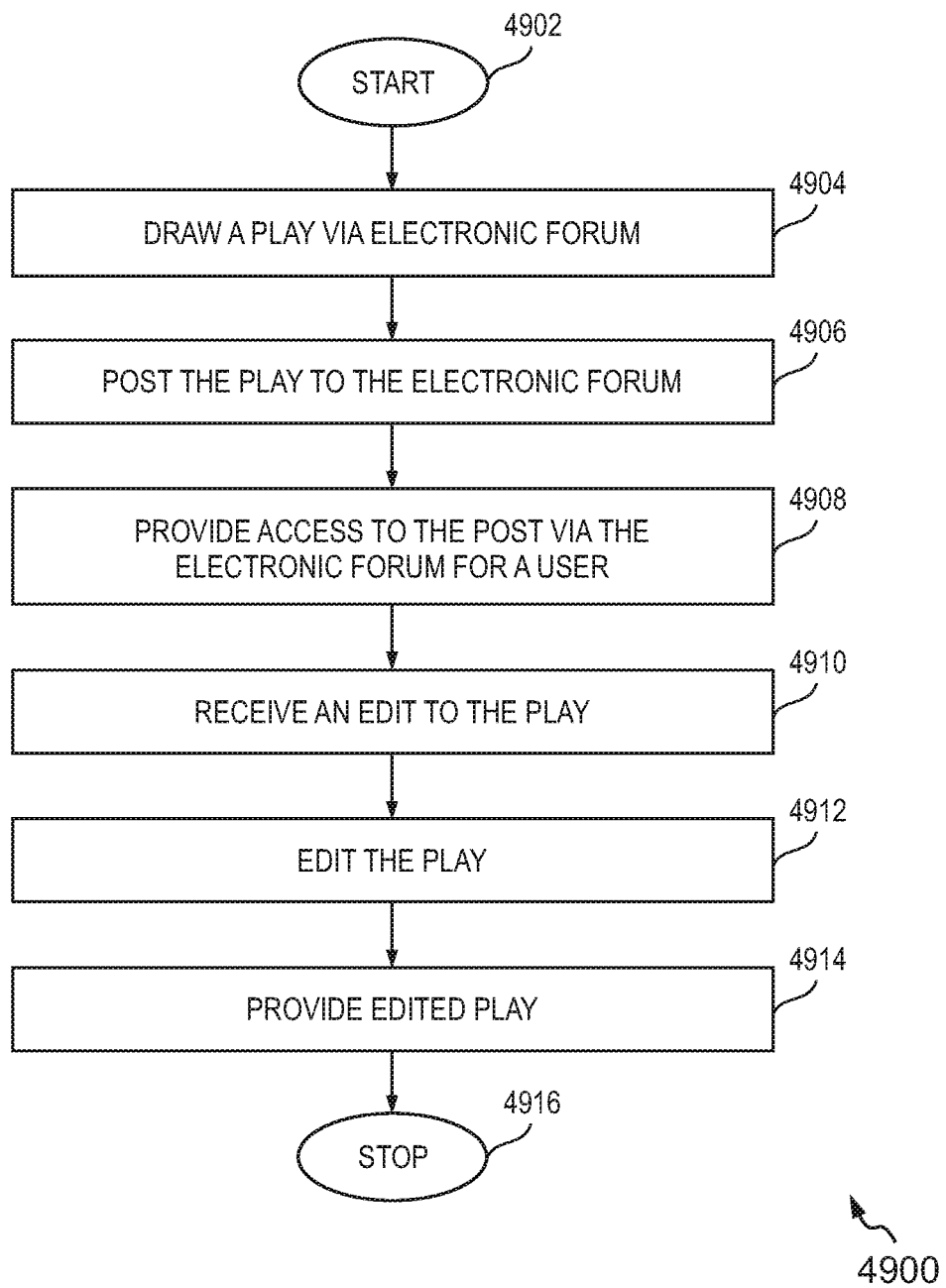
FIG. 49 depicts an example method for generating and managing one or more plays, in accordance with another example embodiment.

FIG. 49 depicts an example method for generating and managing one or more plays, in accordance with an example embodiment of the invention. The method 4900 can be performed by the server 112 or by any of the users' devices, or by a combination of the server 112 and any of the users' devices.

The method starts at operation 4902.

At operation 4904, a play is drawn via an electronic forum. The electronic forum is an electronic portal or a software application that enables various functionalities defined herein. A user (creator) registers with the electronic forum, creates an account and then sees options for creating the play. In response to user inputs, the play is created. In some embodiments, the user is also able to create a team or is already a part of the team. The drawing includes one or more of defining movements of the players, alignment of the players, and location of the players. In case sport is a field game such as football, then the location include formation of the game. The drawing also includes allocating offensive or defensive spots or tags to the players to indicate a player being offensive or defensive.

At operation 4906, the play is posted on the electronic forum and is available for access by other users of the electronic forum. The play is saved and can be searched. In addition, players can also be searched using tags, i.e. offensive or defensive, location at which user plays, or any other data associated with the players. At operation 4908, a user, desires to access the play and the user is provided access to the play. Access rights of the user or those associated with the play may be checked before providing access of the play to the team member.

At operation 4910, an input for editing the play is received from the user or the creator is received and the edit is performed at operation 4912.

At operation 4914, the edited play is provided or made available to the users or the user who created the play.

The method 4900 stops at operation 4916.

Figure 50:
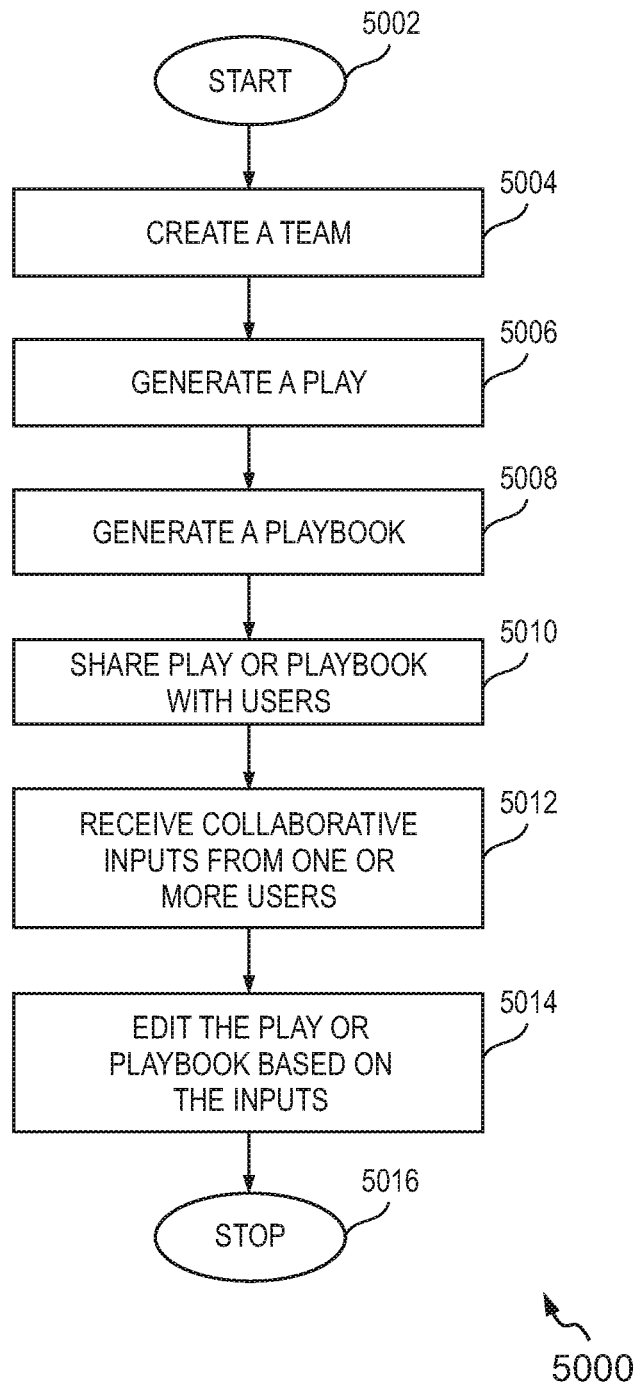
FIG. 50 depicts an example method for generating and managing one or more plays, in accordance with yet another example embodiment.

FIG. 50 depicts another example method 5000 for generating and managing one or more plays, in accordance with another example embodiment. The method 5000 can be performed by the server 112 or by any of the users' devices, or by a combination of the server 112 and any of the users' devices.

The method starts at operation 5002.

At operation 5004, a team is created in response to a team creation input provided by a user. Creation of the team includes selection of team members. The creation also includes allocating rights to team members. For example, the team members can be at least one of a member, a leader or an administrator. The administrator has rights to assign admin rights to other team members. The administrator also has rights to make the team member as a member or as a leader. The leader has more rights compared to the member.

At operation 5006, a play is generated in response to a play generation input provided by the user. The play generation includes marking players and their moves. Virtual clipboard is used for this purpose. Drawing markers and various other buttons present on the clipboard are used for drawing the play. The play includes formations, configurations, annotations or any other form of play.

At operation 5008, a playbook is generated. The playbook is a collection of plays that share some common concept. Many such playbooks can be generated.

At operation 5010, a particular play or entire playbook is shared with team members, i.e. user's part of the team. The access is provided to the team members based on access rights associated with the play or playbook or with the team members. Access rights here indicate authentication or any other types of digital rights management.

At operation 5012, one or more inputs are received from one or more team members for collaborating on the play or playbook.

At operation 5014, the play or the playbook is edited based on the inputs.

In addition, various other options are provided to enable communication regarding the play or playbook from within the game. Posting, commenting, blogging, new sharing etc. is also possible. The ability to draw the play and post the play to the electronic forum where another user can open and edit the play and then post a response provides an efficient way to create and manage the electronic forum. Also, the shared team space enables usage of the same tool for planning as for in game communications.

In some embodiments, access rights are also assigned to team members, or users for accessing the play or playbooks.

The method 5000 stops at operation 5016.

Figure 51:
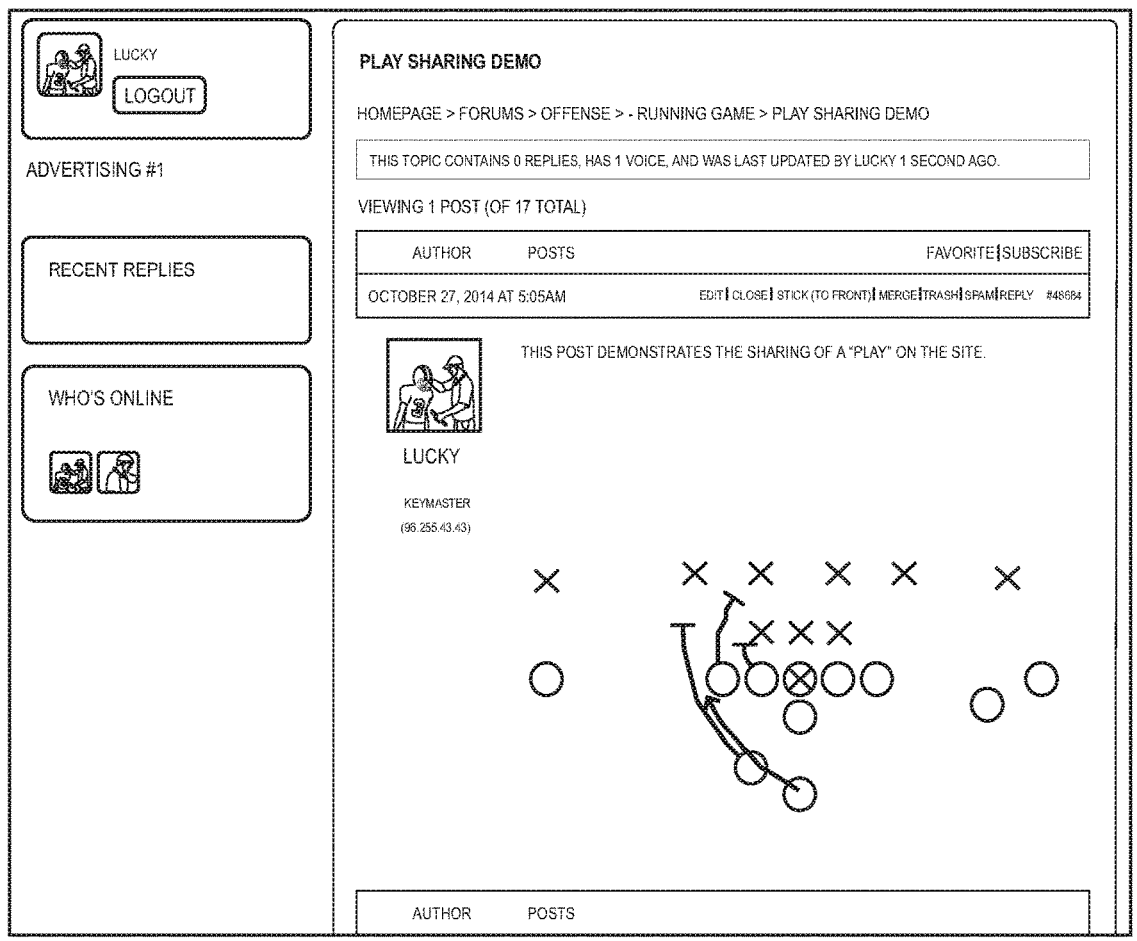
FIG. 51 illustrates play sharing on an electronic forum, in accordance with an example embodiment of the invention.

FIG. 51 illustrates play sharing on a play-sharing page 5100 on an electronic forum, in accordance with an example embodiment of the invention.

The pay sharing page 5100 shows play shared on the electronic forum. Other users are able to view the shared plays, open the plays and make their own updates and repost as part of a reply or their own post. The plays allow participant to communicate back and forth complex ideas pictographically.

Figure 52:
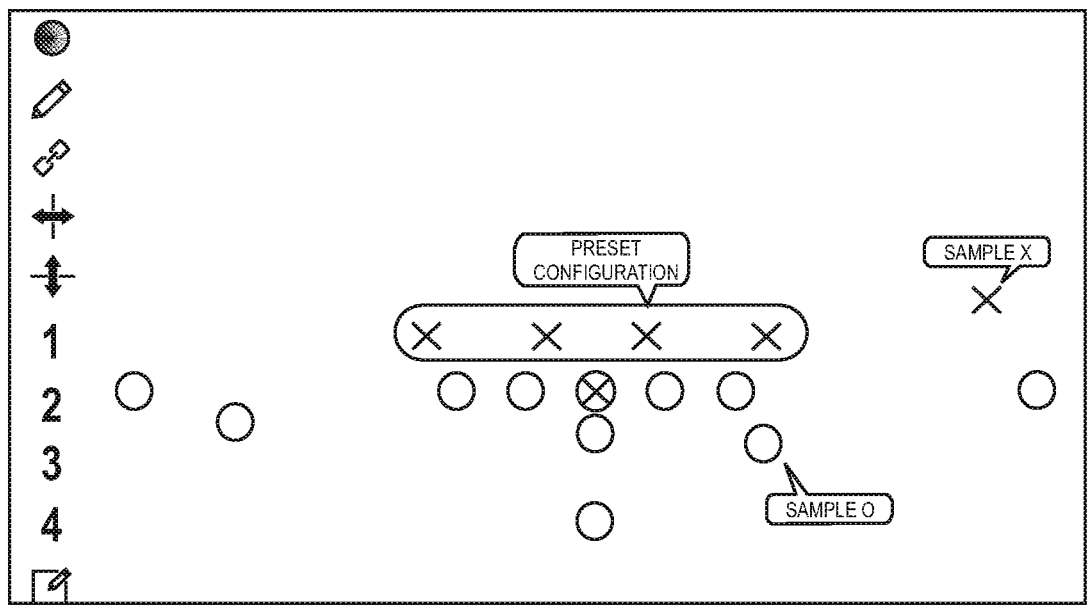
FIG. 52 illustrates presets of virtual clipboard of an electronic forum, in accordance with another example embodiment.

FIG. 52 illustrates presets of virtual clipboard 5200 of an electronic forum, in accordance with another example embodiment.

The virtual clipboard 5200 facilitates drawing typical plays by supplying preset "x" and "o" icons. There are also standard arrow and crossbar headings. There are also different colored markers, custom text for description and annotation, as well as the preset formations and background based on sports.

Figure 53:
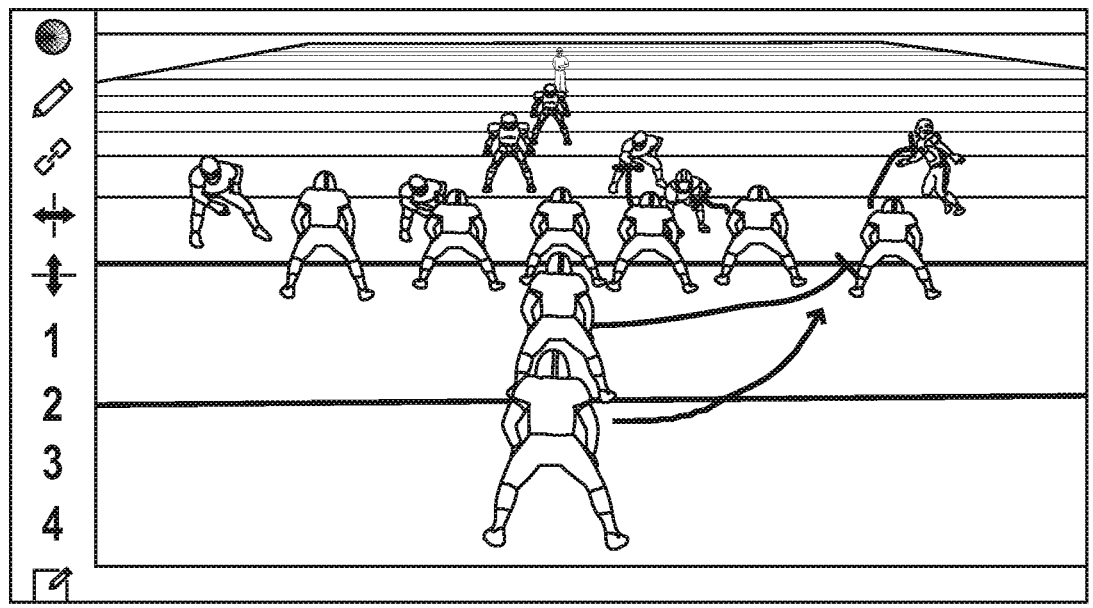
FIG. 53 illustrates drawing on an image underlay on an electronic forum, in accordance with an example embodiment of the invention.
Figure 54:
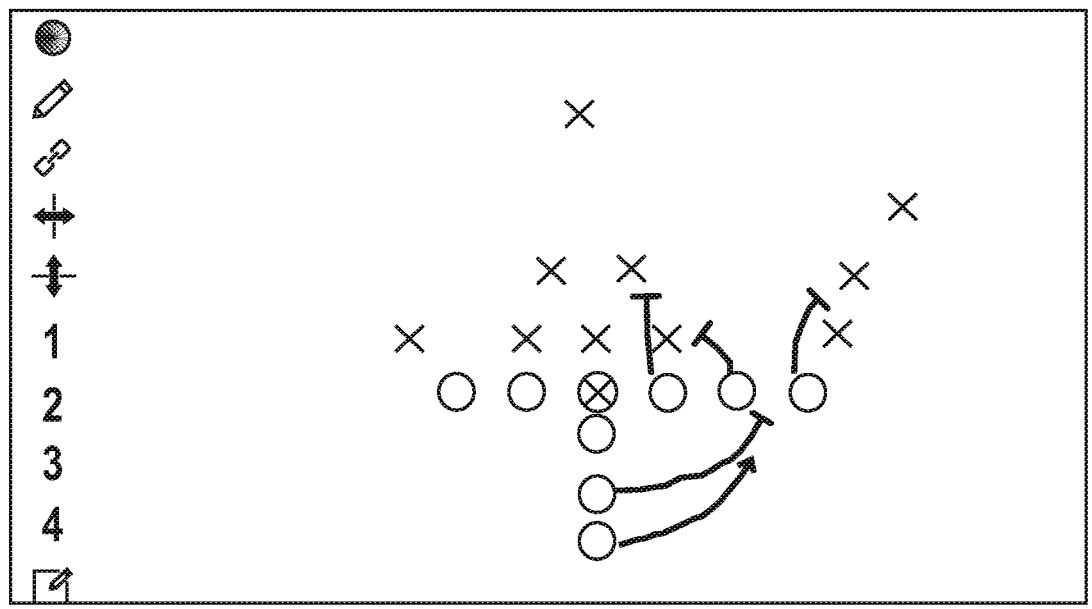
FIG. 54 illustrates interpretation of formation from FIG. 53 on an electronic forum, in accordance with an example embodiment of the invention.

FIG. 53 illustrates drawing on an image underlay 5300 on an electronic forum, in accordance with an example embodiment of the invention. The image underlay 5300 is a photo of a formation. This virtual clipboard enables the user to draw directly over the image underlay 5300. The server 112 uses algorithmic recognition to determine the teams and location of players. The server 112 then places those players in their corresponding positions on a standard clipboard with standard iconography as shown in FIG. 54. FIG. 54 illustrates interpretation of formation from FIG. 53 on an electronic forum, in accordance with an example embodiment of the invention.

Figure 55:
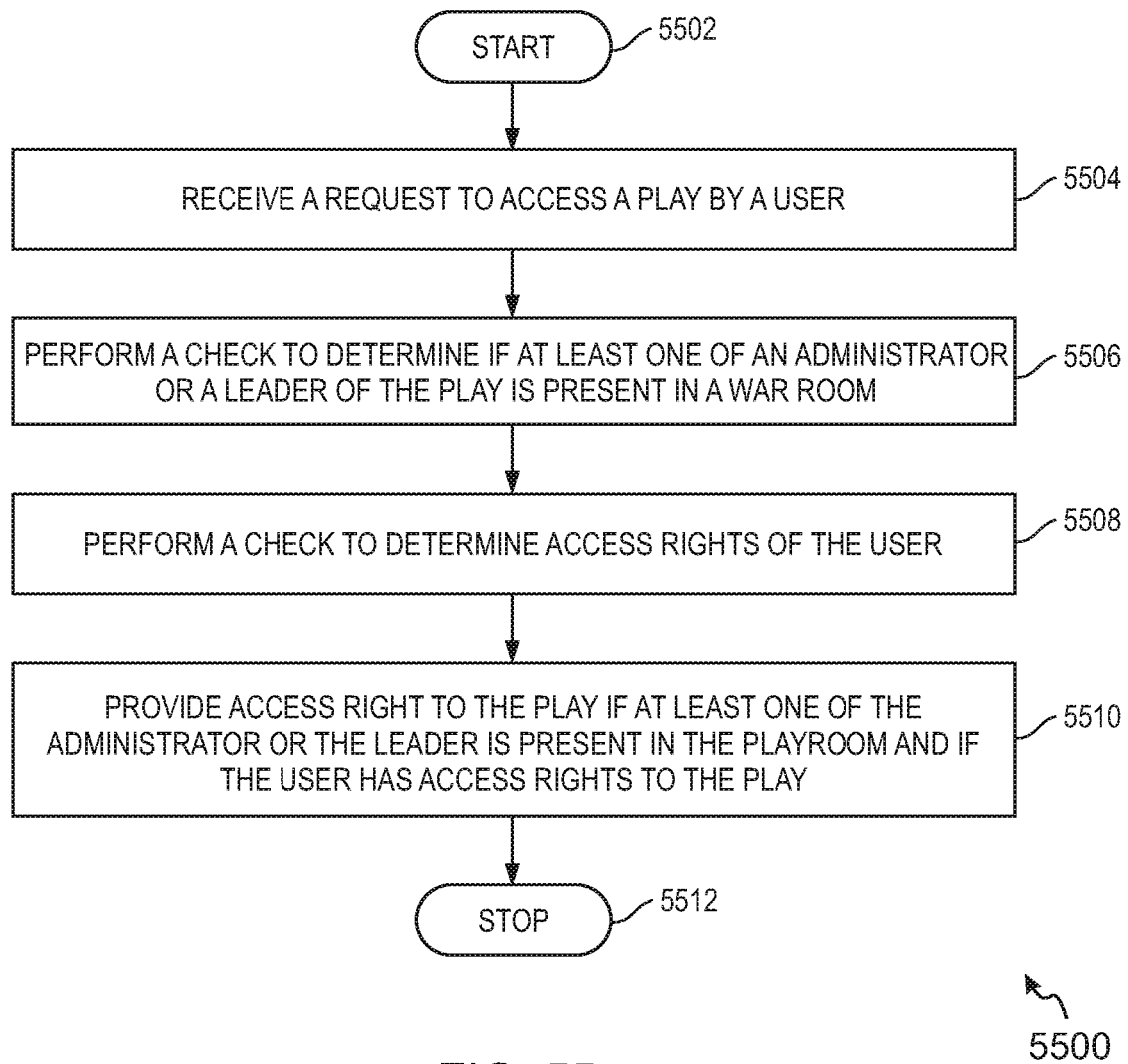
FIG. 55 depicts an example method for generating and managing one or more plays, in accordance with still another example embodiment.

FIG. 55 depicts an example method 5500 for generating and managing one or more plays, in accordance with an example embodiment of the invention.

The method 5500 starts at operation 5502.

At operation 5504, a request is received to access a play by a user.

At operation 5506, a check is made to determine if at least one of an administrator or a leader of the play is present in a war room.

At operation 5508, a check is performed to determine access rights of the user.

At operation 5510, the user is provided access to the play if at least one of the administrator or the leader is present in the playroom and if the user has access rights to the play.

In some embodiments, the user then modifies the play. The user inputs are received by the electronic forum and corresponding changes are made to the play. The user communicates with other team members via at least one of an audio or video.

The method 5500 stops at operation 5512.

Figure 56:
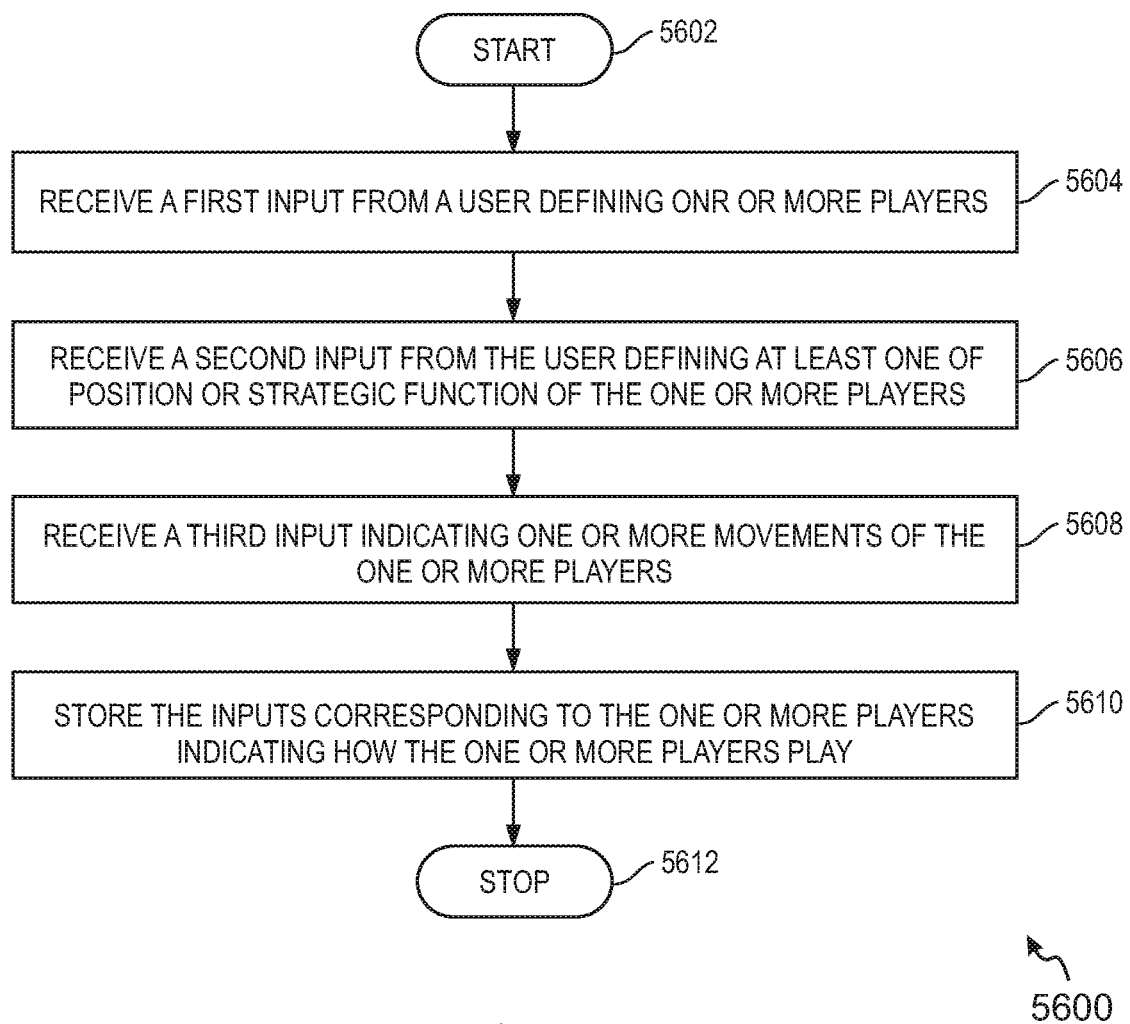
FIG. 56 depicts an example method for generating and managing one or more plays, in accordance with still another example embodiment.

FIG. 56 depicts an example method 5600 for generating and managing one or more plays, in accordance with an example embodiment of the invention.

The method 5600 starts at operation 5602.

At operation 5604, a first input is received from a user defining one or more players. The user may select an option provided via user interface of electronic forum to define a player. A node corresponding to the player is defined. One or more players can be defined in similar manner.

At operation 5606, a second input is received from the user defining at least one of position or strategic function of the one or more players. For example, the user may indicate that a particular player will be a forward position player for a game like football. The position can be defined by the user and also the strategic function or role of the forward player gets assigned or defined for that player.

At operation 5608, a third input is received from the user defining movements of the one or more players. Different positions and functions can be assigned to the player for different instants. For example, at one instant the player can be in forward position while at other instant the player can be a mid fielder. Various user interface options are provided to the user to define the position and the role for the one or more players at different instances of game. Similarly, how the player moves and plays during the entire game can be defined. Relative positions with respect to different players can also be defined. Various formations of the players can also be defined.

At operation 5610, the play including various inputs received from the user for various players indicating how the players will play during the game are stored for further access and editing.

The method 5600 stops at operation 5612.

Figure 57:
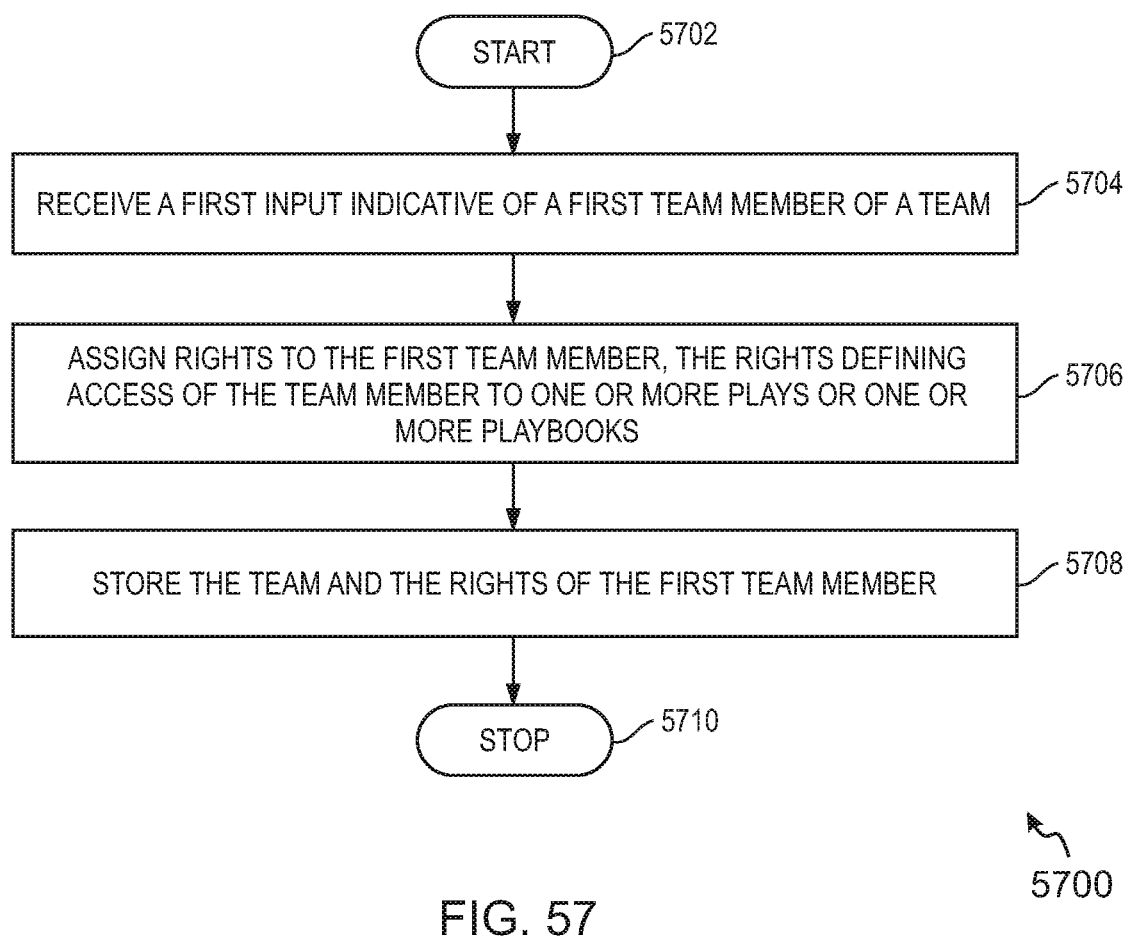
FIG. 57 depicts an example method for generating and managing one or more teams, in accordance with an example embodiment of the invention.

FIG. 57 depicts an example method 5700 for generating and managing one or more teams, in accordance with an example embodiment of the invention.

The method 5700 starts at operation 5702.

At operation 5704, a first input indicative of a first team member of a team is received. The first input can be provided via a user interface provided for generating team.

At operation 5706, a second input indicative of rights assigned to the first team member is received. The rights indicate access rights for the first team member and role of the first team member. For example, the rights indicate if the first team member is a mere team member or have administrative or leadership rights. Several similar inputs can be received from the user creating the team regarding multiple team members. For each team member rights are assigned. The team member selection and rights allocation can happen one by one for a team member or can happen in parallel for several team members.

At operation 5708, the team along with appropriate rights of each team member is stored for later access. The team is then used for various workflows such as sharing of plays, playbooks, participation in war rooms etc.

The method 5700 stops at operation 5710.

Without in any way limiting the scope, interpretation, or application of the claims appearing below, a technical effect of one or more of the example embodiments disclosed herein is to provide an electronic forum that overcomes shortcomings of conventional mechanisms for generating and sharing of sports related information and further enables generating and managing plays in an efficient manner. More specifically, an electronic forum is disclosed that allows sports players/coaches to exchange ideas. Further, the electronic forum allows users to draw sports plays on a virtual clipboard. The virtual clipboard enables users to post formations, configurations, annotations and plays. Other users may view the plays, open the plays, make their own updates and repost them as part of a reply or their own post. The plays allow the users to communicate back and forth complex ideas pictographically.

Furthermore, the electronic forum allows the users to share and discuss these plays in a forum, find news, videos, blogs and sports events, as well as connect with other users to discuss sports topics. A premium service of the electronic forum allows the users to save plays to their personal account and share them privately with other users: their team members. Further, the users can organize their plays in to playbooks and each team will have a war room where the team members can discuss and make shared plays Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 4700 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 49, 50, 55, 56, 57). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for generating a play, the method comprising:
   drawing the play via an electronic forum, the play comprising a plurality of players, the electronic forum comprising: a plurality of buttons or drawing markers for defining moves of the plurality of players, and a virtual clipboard, wherein the virtual clipboard comprises one or more preset formations;
   enabling a user to apply standard alignments by position using at least one preset formation from among the one or more preset formations comprised in the virtual clipboard;
   posting the play to the electronic forum;
   providing access to the play to the user via the electronic forum;
   receiving an edit to the play from the user;
   editing the play;
   providing the edited play;
   creating a team, the team comprising a plurality of team members;
   assigning access rights to the team members;
   providing access to the play based on the rights of the team members;
   facilitating a common board where the team members can draw plays together; and
   modifying the play based on an input from at least one team member who has the access rights.

2. The method as claimed in claim 1, further comprising:
   enabling at least one of audio or video communication among users via the electronic forum.

3. The method as claimed in claim 1, wherein the drawing comprises using symbolism to define moves of the plurality of players.

4. The method as claimed in claim 1, wherein the drawing comprises defining at least one of:
location of players for a field game;
movement of players; and
alignment of players.

5. The method as claimed in claim 1, further comprising performing at least:
sharing the play;
bookmarking the play; and
generating categories and sub-categories for the play.

6. The method as claimed in claim 1, further comprising enabling at least:
searching of the plurality of players;
commenting on the play;
sharing the play outside the electronic forum;
searching for events associated with sport of the play; and
rights management on the play.

7. The method as claimed in claim 1 and further comprising:
generating playbook from the play and one or more plays, the play and the one or more plays having at least one common characteristic.

8. The method as claimed in claim 1, further comprising:
assigning an administrator having admin rights to the team.

9. The method as claimed in claim 1, wherein the plurality of team members comprise at least one of a member and a leader.

10. The method as claimed in claim 1, wherein the play is accessible when at least one of an administrator or a leader is present in a war room comprising the play.

11. The method as claimed in claim 1, wherein the method further comprises storing one or more plays, wherein storing the one or more plays comprises:
storing a pre-determined number of last drawn plays; and
deleting plays other than the pre-determined number of last drawn plays.

12. A method for generating and managing play in an electronic forum, the method comprising:
creating a team, the team comprising a plurality of team members;
generating a play, the play comprising a plurality of players, the electronic forum comprising:
a plurality of buttons or drawing markers for defining moves of the plurality of players, and a virtual clipboard, wherein the virtual clipboard comprises one or more preset formations;
enabling a user to apply standard alignments by position using at least one preset formation from among the one or more preset formations comprised in the virtual clipboard;
sharing the play with the plurality of team members;
receiving inputs from at least one team member for editing the play;
editing the play based on the inputs;
assigning access rights to the team members;
providing access to the play based on the rights of the team members;
facilitating a common board where the team members can draw plays together;
modifying the play based on an input from at least one team member who has the access rights.

13. The method as claimed in claim 12 and further comprising:
generating a playbook using the play and one or more plays, the play and the one or more plays having at least one common characteristic.

14. A system comprising:
a processor; and
a memory coupled to the processor, the memory storing instructions which when executed by the processor cause the system to perform a method for managing a play, the method comprising:
drawing the play via an electronic forum, the play comprising a plurality of players, the electronic forum comprising: a plurality of buttons or drawing markers for defining moves of the plurality of players, and a virtual clipboard, wherein the virtual clipboard comprises one or more preset formations;
enabling a user to apply standard alignments by position using at least one preset formation from among the one or more preset formations comprised in the virtual clipboard;
posting the play to the electronic forum;
providing access to the play to the user via the electronic forum;
receiving an edit to the play from the user;
editing the play;
providing the edited play;
creating a team, the team comprising a plurality of team members;
assigning access rights to the team members;
providing access to the play based on the rights of the team members;
facilitating a common board where the team members can draw plays together; and
modifying the play based on an input from at least one team member who has the access rights.

15. The system as claimed in claim 14, wherein the system further performs:
enabling at least one of audio or video communication among users via the electronic forum.

16. The system as claimed in claim 14, wherein the drawing comprises using symbolism to define moves of the plurality of players.

17. The system as claimed in claim 14, wherein the drawing comprises defining at least one of:
location of players for a field game;
movement of players; and
alignment of players.

18. The system as claimed in claim 14, wherein the system further performs performing at least one of:
sharing the play;
bookmarking the play; and
generating categories or sub-categories for the play.

19. The system as claimed in claim 14, wherein the system further performs enabling at least one of:
searching of the plurality of players;
commenting on the play;
sharing the play outside the electronic forum;
searching for events associated with sport of the play; and
rights management on the play.

* * * * *